(12) United States Patent
Fan et al.

(10) Patent No.: US 12,481,086 B2
(45) Date of Patent: Nov. 25, 2025

(54) OPTICAL LENS ASSEMBLY AND OPTICAL MODULE

(71) Applicant: LARGAN PRECISION CO., LTD., Taichung (TW)

(72) Inventors: Chen-Wei Fan, Taichung (TW);
Ming-Ta Chou, Taichung (TW);
Chien-Pang Chang, Taichung (TW);
Cheng-Feng Lin, Taichung (TW);
Kuo-Chiang Chu, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 707 days.

(21) Appl. No.: 17/814,046

(22) Filed: Jul. 21, 2022

(65) Prior Publication Data

US 2023/0058946 A1 Feb. 23, 2023

Related U.S. Application Data

(60) Provisional application No. 63/228,675, filed on Aug. 3, 2021.

(30) Foreign Application Priority Data

May 4, 2022 (TW) .................................. 111116879

(51) Int. Cl.
*G02B 1/113* (2015.01)
*G02B 1/118* (2015.01)
*G02B 1/12* (2006.01)

(52) U.S. Cl.
CPC .............. *G02B 1/113* (2013.01); *G02B 1/118* (2013.01); *G02B 1/12* (2013.01)

(58) Field of Classification Search
None
See application file for complete search history.

(56) References Cited

U.S. PATENT DOCUMENTS 9,158,039 B2 10/2015 Okuno et al.
9,405,044 B2 8/2016 Okuno
(Continued)

FOREIGN PATENT DOCUMENTS

CN 202093231 U 12/2011
CN 112462454 A 3/2021
(Continued)

OTHER PUBLICATIONS

Ohara, "S-TIH53", <https://oharacorp.com/wp-content/uploads/datasheets/estih53.pdf>, Retrieved from the world wide web Apr. 17, 2025 (hereafter Ohara) (Year: 2025).*

*Primary Examiner* — Derek S. Chapel
(74) *Attorney, Agent, or Firm* — McClure, Qualey & Rodack, LLP

(57) ABSTRACT

An optical lens assembly includes a glass lens element. The glass lens element has a refractive power, an optical surface of the glass lens element is non-planar, an anti-reflective membrane layer is formed on the optical surface, and the anti-reflective membrane layer includes a nanostructure layer and a structure connection film. The nanostructure layer has a plurality of ridge-like protrusions extending non-directionally from the optical surface, and a material of the nanostructure layer includes aluminum oxide. The structure connection film is disposed between the optical surface and the nanostructure layer, the structure connection film includes at least one silicon dioxide layer, the at least one silicon dioxide layer contacts a bottom of the nanostructure layer physically, and a thickness of the at least one silicon dioxide layer is greater than or equal to 20 nm and less than or equal to 150 nm.

30 Claims, 19 Drawing Sheets

(56) References Cited

U.S. PATENT DOCUMENTS

| | | |
|---|---|---|
| 9,684,100 B2 | 6/2017 | Choi et al. |
| 10,025,006 B2 | 7/2018 | Yoshizawa et al. |
| 10,539,716 B2 | 1/2020 | Schulz et al. |
| 10,983,253 B2 | 4/2021 | Makino et al. |
| 11,029,450 B2 | 6/2021 | Henn et al. |
| 11,029,514 B2 | 6/2021 | Horvolgyi et al. |
| 2005/0225878 A1* | 10/2005 | Tanaka ............... G02B 27/0018 359/722 |
| 2006/0199040 A1 | 9/2006 | Yamada et al. |
| 2012/0086848 A1* | 4/2012 | Tsai ................ G02B 13/004 348/340 |
| 2015/0185446 A1* | 7/2015 | Hsu ................ G02B 13/0045 348/294 |
| 2017/0315269 A1 | 11/2017 | Ogane |
| 2018/0011224 A1* | 1/2018 | Takahashi ............... B32B 7/12 |
| 2020/0166734 A1 | 5/2020 | Chung |
| 2021/0070654 A1 | 3/2021 | Fan et al. |

FOREIGN PATENT DOCUMENTS

| | | |
|---|---|---|
| TW | 202110621 A | 3/2021 |
| TW | 202121008 A | 6/2021 |

\* cited by examiner

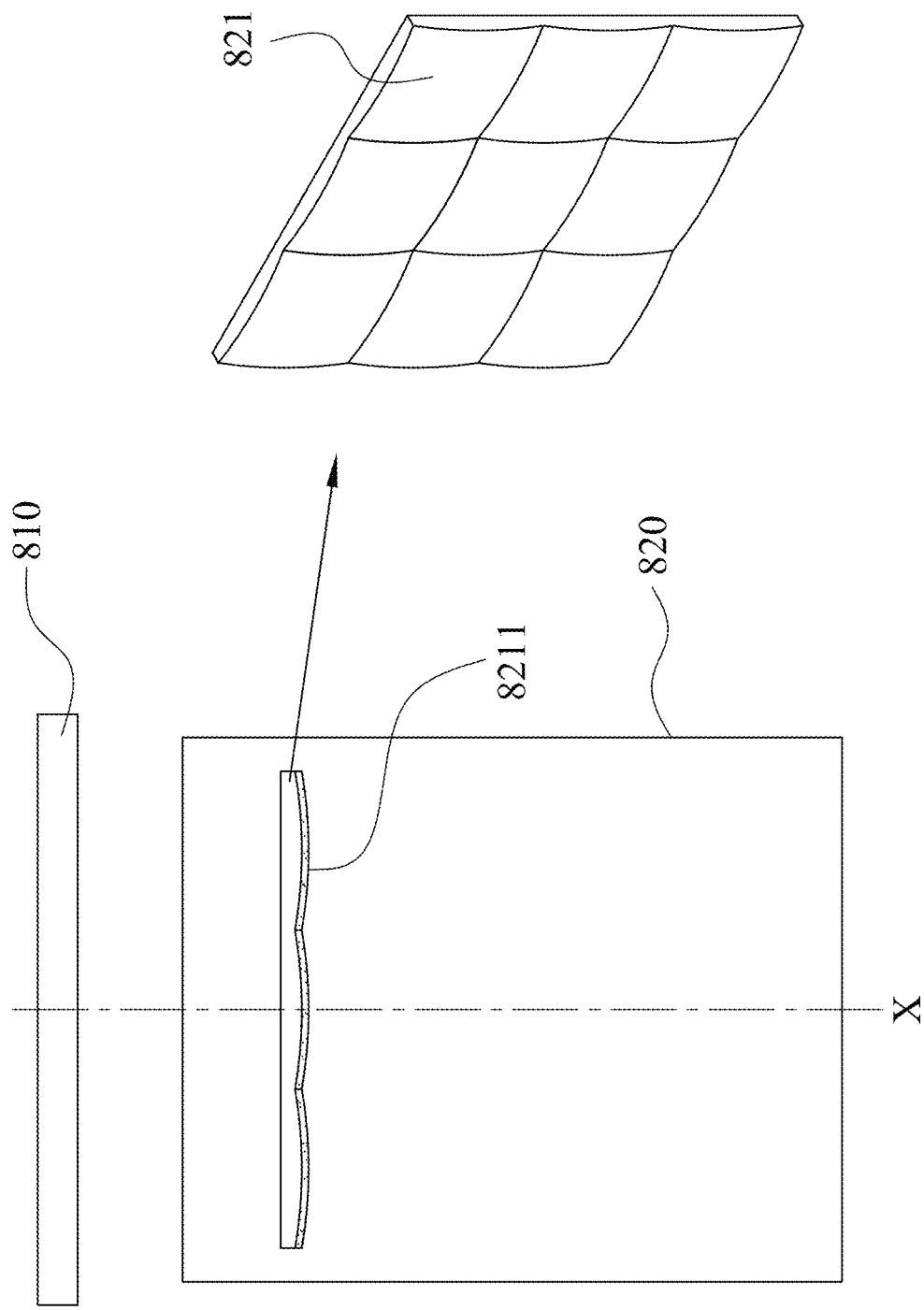

OPTICAL LENS ASSEMBLY AND OPTICAL MODULE

RELATED APPLICATIONS

This application claims priority to U.S. Provisional Application Ser. No. 63/228,675, filed Aug. 3, 2021, and Taiwan Application Serial Number 111116879, filed May 4, 2022, which are herein incorporated by reference.

BACKGROUND

Technical Field

The present disclosure relates to an optical module and an optical lens assembly. More particularly, the present disclosure relates to an optical lens assembly having an anti-reflective membrane layer and an optical module.

Description of Related Art

In recent years, camera modules which are developed rapidly and have been filled with the lives of modern people are applied in various fields such as portable electronic devices, head-mounted devices, vehicle devices and etc. Accordingly, the optical module is also flourished. However, as technology is more and more advanced, demands for the quality of the optical module of users have become higher and higher, wherein the anti-reflective membrane layer is one of major factors of affecting image quality. However, the difference of thermal expansivity between the conventional anti-reflective membrane layer and the substrate is large, so a relative displacement occurs at the interface between the conventional anti-reflective membrane layer and the substrate due to temperature changing, and layer detachment or destruction may occur easily so as to affect image quality. Therefore, developing an optical module which can resist against temperature changing and maintain image quality becomes an important and solving problem in industry.

SUMMARY

According to one aspect of the present disclosure, an optical lens assembly, which an optical axis passes through an optical lens assembly, includes a glass lens element. The glass lens element has a refractive power, an optical surface of the glass lens element is non-planar, an anti-reflective membrane layer is formed on the optical surface, and the anti-reflective membrane layer includes a nanostructure layer and a structure connection film. The nanostructure layer has a plurality of ridge-like protrusions extending non-directionally from the optical surface, and a material of the nanostructure layer includes aluminum oxide. The structure connection film is disposed between the optical surface and the nanostructure layer, the structure connection film includes at least one silicon dioxide layer, the at least one silicon dioxide layer contacts a bottom of the nanostructure layer physically, and a thickness of the at least one silicon dioxide layer is greater than or equal to 20 nm and less than or equal to 150 nm. When the glass lens element has a first average linear expansivity $\alpha_1$ in a temperature region between $-30°$ C. to $70°$ C., and the following condition is satisfied: $12\times10^{-7}/K < \alpha_1 < 210\times10^{-7}/K$.

According to one aspect of the present disclosure, an optical module includes a light source and an optical lens assembly. An optical axis passes through the optical lens assembly, and the optical lens assembly includes at least three lens elements. At least one of the at least three lens elements is a glass lens element, wherein the glass lens element has a refractive power, the glass lens element is closer to the light source than the other at least two lens elements, an optical surface of the glass lens element is non-planar, an anti-reflective membrane layer is formed on the optical surface, and the anti-reflective membrane layer includes a nanostructure layer and a structure connection film. The nanostructure layer has a plurality of ridge-like protrusions extending non-directionally from the optical surface, and a material of the nanostructure layer includes aluminum oxide. The structure connection film is disposed between the optical surface and the nanostructure layer, the structure connection film includes at least one silicon dioxide layer, the at least one silicon dioxide layer contacts a bottom of the nanostructure layer physically, and a thickness of the at least one silicon dioxide layer is greater than or equal to 20 nm and less than or equal to 150 nm. When the glass lens element has a first average linear expansivity $\alpha_1$ in a temperature region between $-30°$ C. to $70°$ C., and the following condition is satisfied: $12\times10^{-7}/K < \alpha_1 < 210\times10^{-7}/K$.

According to one aspect of the present disclosure, an optical module includes a light source and an optical lens assembly. An optical axis passes through the optical lens assembly, and the optical lens assembly includes at least three lens elements. At least one of the at least three lens elements is a glass lens element, wherein the glass lens element has a refractive power, the glass lens element is closer to the light source than the other at least two lens elements, an optical surface of the glass lens element is non-planar, an anti-reflective membrane layer is formed on the optical surface, and the anti-reflective membrane layer includes a nanostructure layer and a structure connection film. The nanostructure layer has a plurality of ridge-like protrusions extending non-directionally from the optical surface, and a material of the nanostructure layer includes aluminum oxide. The structure connection film is disposed between the optical surface and the nanostructure layer, the structure connection film includes at least one silicon dioxide layer, the at least one silicon dioxide layer contacts a bottom of the nanostructure layer physically, and a thickness of the at least one silicon dioxide layer is greater than or equal to 20 nm and less than or equal to 150 nm. When a maximum effective radius of the optical surface is Y, an intersection point between the optical surface and the optical axis to a position of the maximum effective radius of the optical surface has a maximum displacement $SAG_{glass}$, the glass lens element has a first average linear expansivity $\alpha_1$ in a temperature region between $-30°$ C. to $70°$ C., and the following conditions are satisfied: $0.01 \leq SAG_{glass}/Y \leq 0.99$; and $12\times10^{-7}/K < \alpha_1 < 210\times10^{-7}/K$.

BRIEF DESCRIPTION OF THE DRAWINGS

The present disclosure can be more fully understood by reading the following detailed description of the embodiment, with reference made to the accompanying drawings as follows:

FIG. 10 shows a cross-sectional schematic view of the anti-reflective membrane layer on the optical surface of the glass lens element under an electronic microscope according to the 1st embodiment in FIG. 1B.

FIG. 8D shows a schematic view of an optical module according to the 8th embodiment in FIG. 8B.

DETAILED DESCRIPTION

Figure 1A:
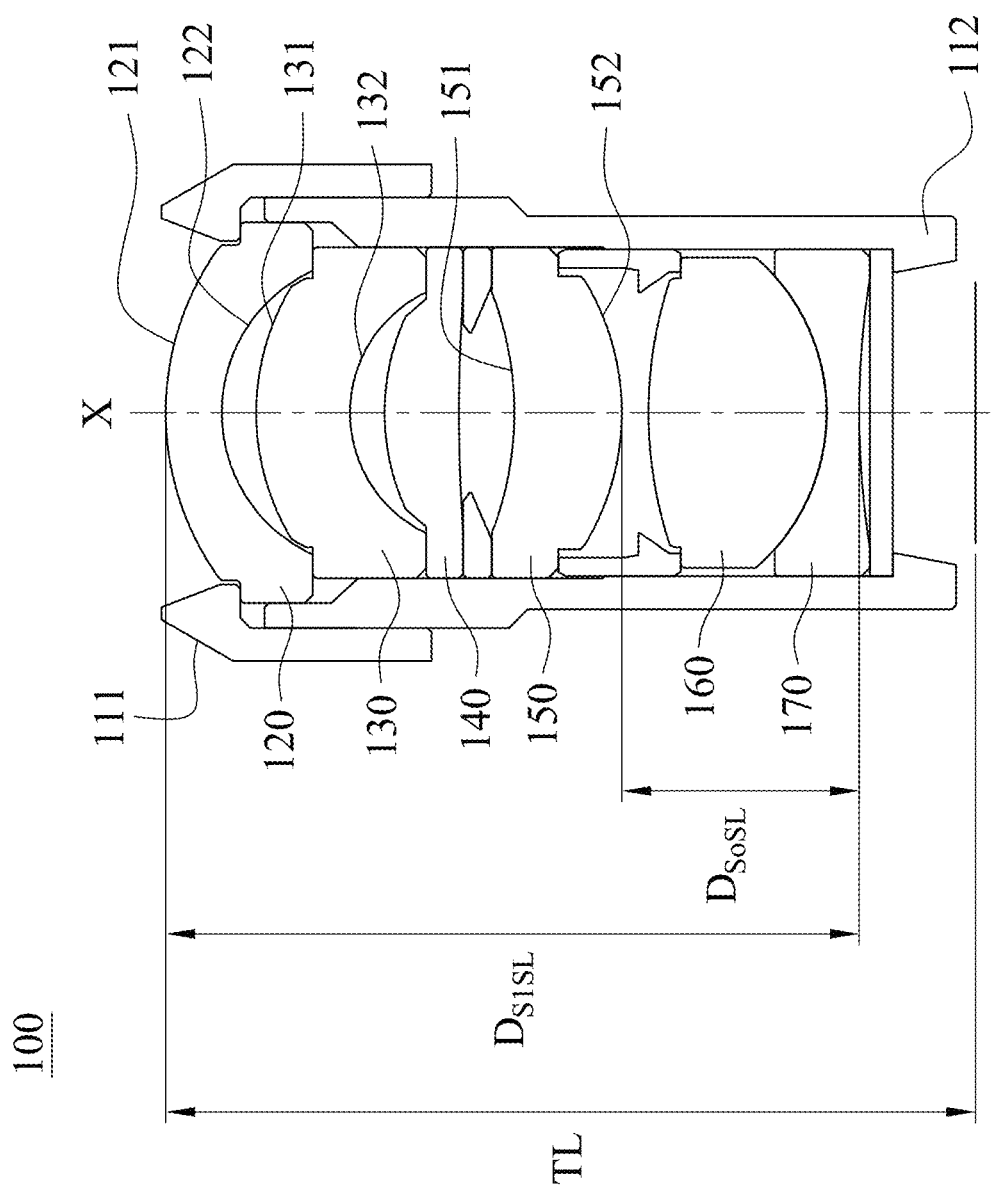
FIG. 1A shows a schematic view of an optical lens assembly of an optical module according to the 1st embodiment of the present disclosure.

The present disclosure provides an optical module which includes a light source and an optical lens assembly. An optical axis passes through the optical lens assembly and the optical lens assembly includes a glass lens element. The glass lens element has a refractive power, an optical surface of the glass lens element is non-planar, an anti-reflective membrane layer is formed on the optical surface, and the anti-reflective membrane layer includes a nanostructure layer and a structure connection film. The nanostructure layer has a plurality of ridge-like protrusions extending non-directionally from the optical surface, a material of the nanostructure layer includes aluminum oxide, and an average structure height of the nanostructure layer is greater than or equal to 80 nm and less than or equal to 350 nm. The structure connection film is disposed between the optical surface and the nanostructure layer, the structure connection film includes at least one silicon dioxide layer, and the silicon dioxide layer contacts a bottom of the nanostructure layer physically, and a thickness of the silicon dioxide layer is greater than or equal to 20 nm and less than or equal to 150 nm. When the glass lens element has a first average linear expansivity $\alpha_1$ in a temperature region between −30° C. to 70° C., the following condition is satisfied: $12\times10^{-7}/K < \alpha_1 < 210\times10^{-7}/K$. Via disposing the glass lens element with lower linear expansivity $\alpha_1$, the relative displacement between the anti-reflective membrane layer and an interface of the glass lens element by temperature changing can be reduced, and the problem such as variation of membrane thickness, detachment of layers, splitting of a membrane etc. can be avoided so as to improve the stability of the anti-reflective membrane layer on the optical surface in the environment of extremely temperature changing to maintain the imaging quality of the optical lens assembly in the impact by heat or cold.

The optical lens assembly can further include at least three lens elements. At least one of the at least three lens elements is the aforementioned glass lens element, and the glass lens element is closer to the light source than the other at least two lens elements. When a distance from a first side surface to a second side surface of the optical lens assembly along the optical axis is $D_{S1SL}$, and a distance from the optical surface to the second side surface along the optical axis is $D_{SoSL}$, the following condition can be satisfied: $0.12 \leq D_{SoSL}/D_{S1SL} < 0.985$. By disposing the anti-reflective membrane layer at a specific position of the optical lens assembly, surface reflection of non-imaging light can be reduced.

Each of the ridge-like protrusions is in a shape shrinking from a bottom to a top thereof inspected from a cross section of the glass lens element, that is, the structure of the ridge-like protrusions can decrease the effective reflectivity of the nanostructure layer from the bottom (mountain foot part) to the top (mountain summit part) thereof gradually and a rough surface can be formed to decrease reflection of stray light.

Specifically, the nanostructure layer can have porous structure, and a distance between the adjacent non-directional protrusions increases along a direction from the optical surface to the air so that the effective refractive index of the nanostructure layer varies to 1.00. The refractive index difference between the anti-reflective membrane layer and the glass lens element interface decreases to reduce possibility of light reflection.

Moreover, when a maximum effective radius of the optical surface is Y, and an intersection point between the optical surface and the optical axis to a position of the maximum effective radius of the optical surface has a maximum displacement $SAG_{glass}$, the following condition can be satisfied: $0.01 \leq SAG_{glass}/Y \leq 0.99$. Via the configuration of the optical surface, the anti-reflective membrane layer can be formed on the optical surface with curvature so as to improve design freedom.

Furthermore, when the intersection point between the optical surface and the optical axis to a position of the maximum effective radius of the optical surface has a maximum displacement $SAG_{glass}$, the following condition can be satisfied: $90\ \mu m \leq SAG_{glass}$. Hence, the anti-reflective membrane layer can be formed on the optical surface with curvature so as to improve design freedom.

Specifically, the glass lens element can be a grinding glass lens element or a molded glass lens element, but the present disclosure is not limiter thereto. When a thickness of the nanostructure layer is t, and t=0 nm, the structure connection film can be exposed to the air.

When a maximum value of reflectivity of the optical surface of the glass lens element in a wavelength region between 400 nm and 780 nm is $R_{abs}$, the following condition can be satisfied: $0\% \leq R_{abs} \leq 1.0\%$. When an average value of reflectivity of the optical surface of the glass lens element in the wavelength region between 400 nm and 780 nm is $R_{avg}$, the following condition can be satisfied: $0\% \leq R_{avg} \leq 0.5\%$. Hence, the low reflectivity can be remained to avoid reflection of stray light.

When the glass lens element has the first average linear expansivity $\alpha_1$ in the temperature region between −30° C. to 70° C., and the structure connection film has a second average linear expansivity $\alpha_2$ in the temperature region between −30° C. to 70° C., the following condition can be satisfied: $0.2 < \alpha_1/\alpha_2 < 41$. Specifically, a linear expansivity of aluminum oxide crystal of the nanostructure layer can be $40 \times 10^{-7}/K$-$100 \times 10^{-7}/K$, a linear expansivity of the silicon dioxide layer of the structure connection film can be $5.5 \times 10^{-7}/K$-$7.5 \times 10^{-7}/K$, the first average linear expansivity $\alpha_1$ of the glass lens element can be $40 \times 10^{-7}/K$-$180 \times 10^{-7}/K$, but the present disclosure is not limited thereto. Compared with a linear expansivity of the conventional optical plastic lens element which is $600 \times 10^{-7}/K$-$700 \times 10^{-7}/K$, the linear expansivity of each of the glass lens element and the anti-reflective membrane layer is close to each other so that the relative displacement between the glass lens element and the anti-reflective membrane layer becomes small to further improve stability of the anti-reflective membrane layer on the optical surface.

Moreover, the structure connection film can be a film formed by a plurality of membrane layers stacked alternately with high and low refractive index differences, and a top of the structure connection film is the silicon dioxide layer which contacts the nanostructure layer physically.

When a temperature coefficient of refractive index of the glass lens element in the temperature region between −30° C. to 70° C. is dn/dt, the following condition can be satisfied: $0.1 \times 10^{-6}/° C. \leq |dn/dt| \leq 17 \times 10^{6}/° C$. In detail, the refractive index difference of an optical glass lens element is varied with temperature, a temperature coefficient of index of refraction in a medium such as air is so-called a temperature coefficient of relative index of refraction, and the temperature coefficient of refractive index dn/dt is a temperature coefficient of refractive index measured by spectral line at wavelength 587.56 nm (d-line). Via disposing the glass lens element with the low temperature coefficient of refractive index dn/dt, thermal defocusing of the optical lens assembly can be reduced to maintain the imaging quality of the lens elements in the impact by heat or cold.

The optical surface can have an inflection point. Specifically, except for the anti-reflective membrane layer on the optical surface, an anti-fog layer, anti-abrasion layer, light-blocking coating layer or etc. can be disposed on the optical surface, but the present disclosure is not limited thereto.

When a distance from an object-side surface of a first side lens element of the optical lens assembly to an image surface along the optical axis is TL, the following condition can be satisfied: 8 mm TL. By increasing a distance of the total length of the optical lens assembly, lens elements with positive or negative refractive power can be configured effectively to decrease occurrences of thermal defocusing.

The glass lens element can be disposed at a first side of the optical lens assembly, and the optical lens assembly can further include a plastic lens element which is disposed at an image side of the glass lens element along the optical axis. Furthermore, a first lens element at the first side of the optical lens assembly is the most sensitive lens element in the optical lens assembly to temperature effect. Hence, when the first lens element is the glass lens element with the low linear expansivity $\alpha_1$ and the low temperature coefficient of refractive index dn/dt, the optical lens assembly can be maintained to be stable after temperature changing, and the function (membrane thickness, adhesion, completeness of a membrane layer and a cut-off wavelength) of the anti-reflective membrane layer can be maintained. Meanwhile, the optical lens assembly can be matched with plastic lens elements to improve design freedom, increase productivity, and decrease the production cost.

The optical lens assembly can further include a cemented lens element. Hence, chromatic aberration can be reduced.

The optical module can further include at least one light path folding element which is disposed on at least one side of an object side and an image side of the optical lens assembly. Hence, accommodated space of the optical module can be adjusted according to requirements to fit a compact electronic device.

Moreover, the glass lens element can be an array lens element. The light source can be a plurality of display elements arranged in array. Specifically, the arrangement of the display elements can be the same as the arrangement of the array lens element, but the present disclosure is not limited thereto.

According to the above description of the present disclosure, the following specific embodiments are provided for further explanation.

1st Embodiment

FIG. 1A shows a schematic view of an optical lens assembly 100 of an optical module according to the 1st embodiment of the present disclosure. As shown in FIG. 1A, an optical module (its reference numeral is omitted) includes a light source (not shown) and an optical lens assembly 100. An optical axis X passes through the optical lens assembly 100, and the optical lens assembly 100 includes a lens barrel (its reference numeral is omitted) and at least three lens elements. The at least three lens elements, which are, in order from an object side to an image side, glass lens elements 120, 130, a lens element 140, a glass lens element 150 and lens elements 160, 170 are disposed in the lens barrel, wherein the glass lens elements 120, 130 are closer to the light source than the lens elements 140, 160, 170 to the light source. Each of the glass lens elements 120, 130, 150 and lens elements 140, 160, 170 has refractive power, and optical surfaces of the glass lens elements 120, 130, 150 and the lens elements 140, 160, 170 are non-planar. Moreover, anti-reflective membrane layers 121, 122 are formed on the optical surfaces of the glass lens element 120 (that is, two surfaces of the glass lens element 120), respectively, anti-reflective membrane layers 131, 132 are formed on the optical surfaces of the glass lens element 130 (that is, two surfaces of the glass lens element 130), respectively, and anti-reflective membrane layers 151, 152 are formed on the optical surfaces of the glass lens element 150 (that is, two surfaces of the glass lens element 150), respectively.

Figure 1B:
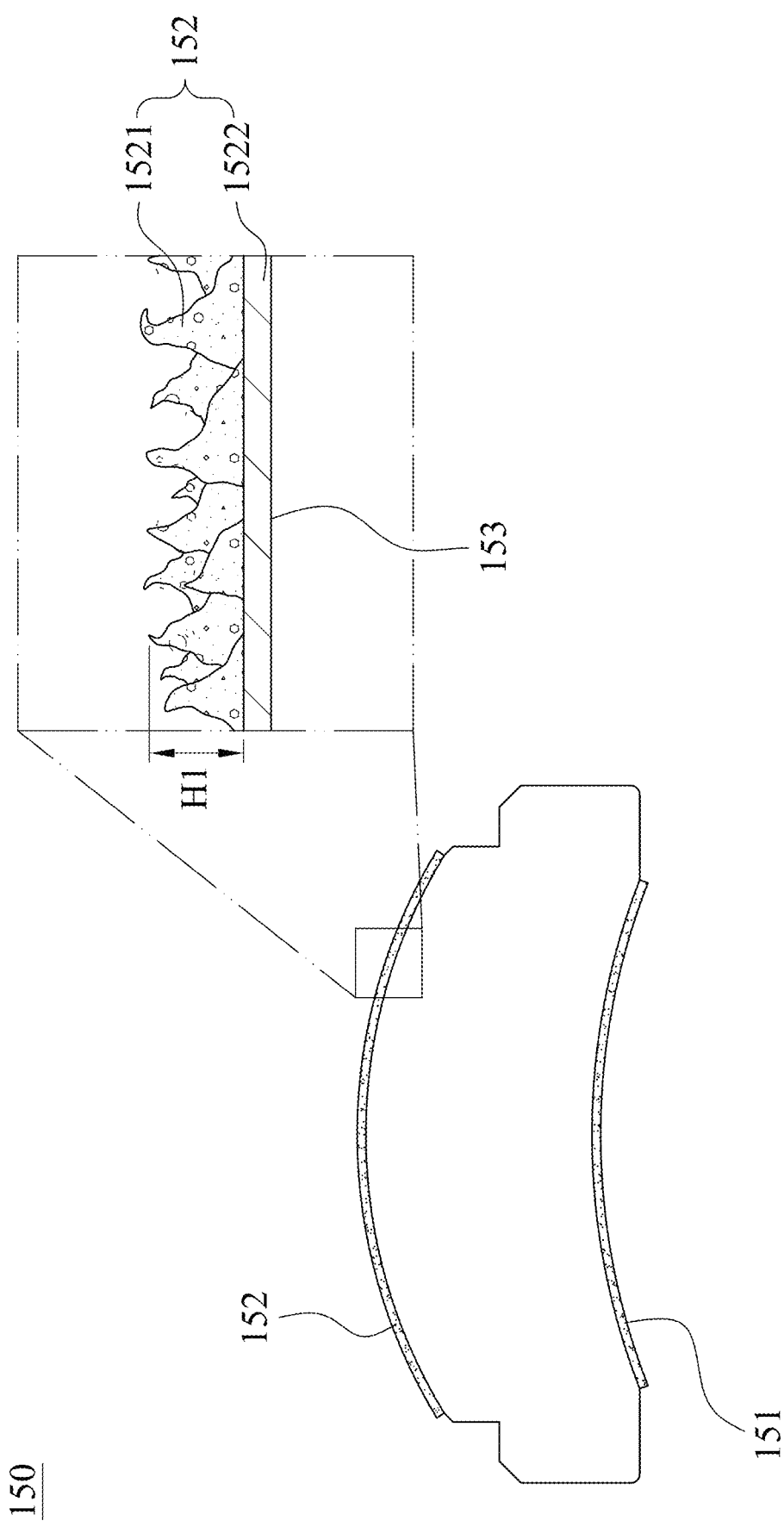
FIG. 1B shows a schematic view of the glass lens element according to the 1st embodiment in FIG. 1A.
Figure 1C:
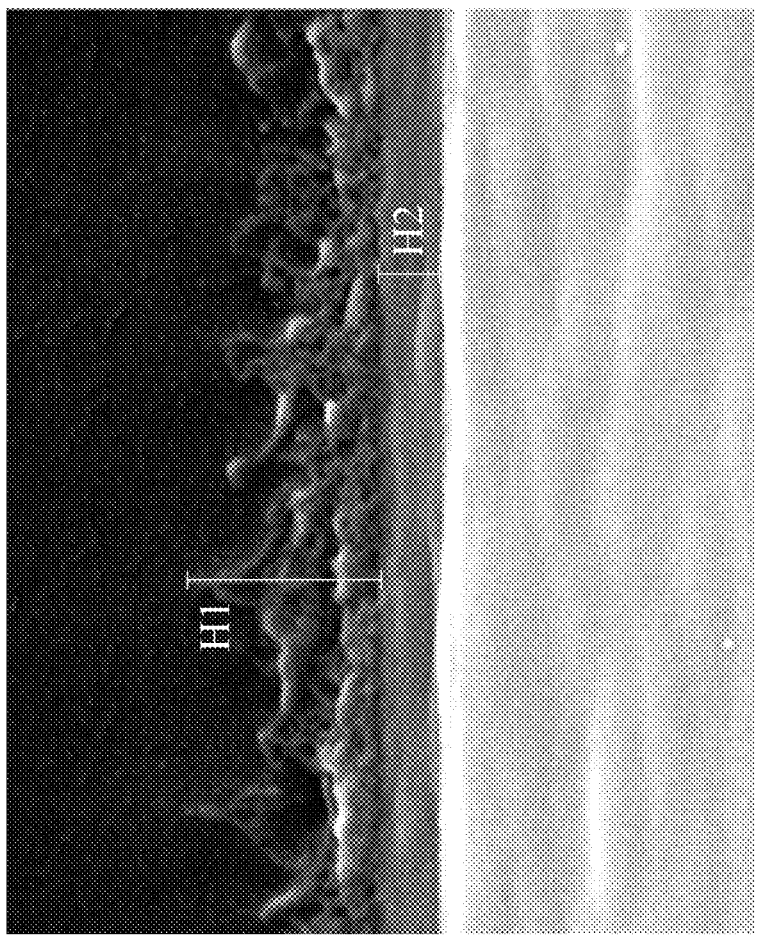
FIG. 1D shows a schematic view of parameters of reflectivity of each of an object-side surface and an image-side surface of the glass lens elements without disposing anti-reflective membrane layers according to the 1st embodiment in FIG. 1B.
FIG. 1E shows a schematic view of parameters of reflectivity of each of the object-side surface and the image-side surface of the glass lens elements with disposing the anti-reflective membrane layers according to the 1st embodiment in FIG. 1B.

FIG. 1B shows a schematic view of the glass lens element 150 according to the 1st embodiment in FIG. 1A. FIG. 1O shows a cross-sectional schematic view of the anti-reflective membrane layer 152 on the optical surface 153 of the glass lens element 150 under an electronic microscope according to the 1st embodiment in FIG. 1B. As shown in FIGS. 1B and 1C, the anti-reflective membrane layer 152 is formed on the optical surface 153 of the glass lens element 150, and the anti-reflective membrane layer 152 includes a nanostructure layer 1521 and a structure connection film 1522. The nanostructure layer 1521 has a plurality of ridge-like protrusions extending non-directionally from the optical surface 153, a material of the nanostructure layer 1521 includes aluminum oxide, and an average structure height of the nanostructure layer 1521 is greater than or equal to 80 nm and less than or equal to 350 nm. Specifically, each of the ridge-like protrusions is in a shape shrinking from a bottom to a top thereof. When a structural height of the nanostructure layer 1521 inspected (destructive measurement) from the cross section, a vertical distance from the bottom (mountain foot part) to the top (mountain summit part) of each of the ridge-like protrusions is H1, and the average structure height of the at least three or more ridge-like protrusions of the nanostructure layer 1521 (that is, the average height of H1) can be greater than or equal to 80 nm and less than or equal to 350 nm. In the 1st embodiment, the structure height H1 of the nanostructure layer 1521 is 247.4 nm, but the present disclosure is not limited thereto.

The structure connection film 1522 is disposed between the optical surface 153 and the nanostructure layer 1521, the structure connection film 1522 includes at least one silicon dioxide layer (not shown), and the silicon dioxide layer contacts a bottom of the nanostructure layer 1521 physically, and a thickness of the silicon dioxide layer is greater than or equal to 20 nm and less than or equal to 150 nm. In the 1st embodiment, the thickness of the silicon dioxide layer is 75.15 nm, but the present disclosure is not limited thereto.

As shown in FIG. 1A, the optical lens assembly 100 can further include a cemented lens element. Specifically, in the 1st embodiment, the lens elements 160, 170 are cemented to form a cemented lens element, and an image-side surface of the lens element 160 is cemented with an object-side surface of the lens element 170.

As shown in FIG. 1A, the lens barrel includes a front cover 111 and a barrel body 112. The front cover 111 covers the barrel body 112. The glass lens element 120 contacts the front cover 111, the glass lens elements 120, 130, 150 and the lens elements 140, 160, 170 are accommodated in and contact the barrel body 112. Moreover, other optical elements such as a light blocking sheet, a spacer, a retainer and etc. can be disposed in the lens barrel on demand, but it will not be described herein.

Figure 1D:
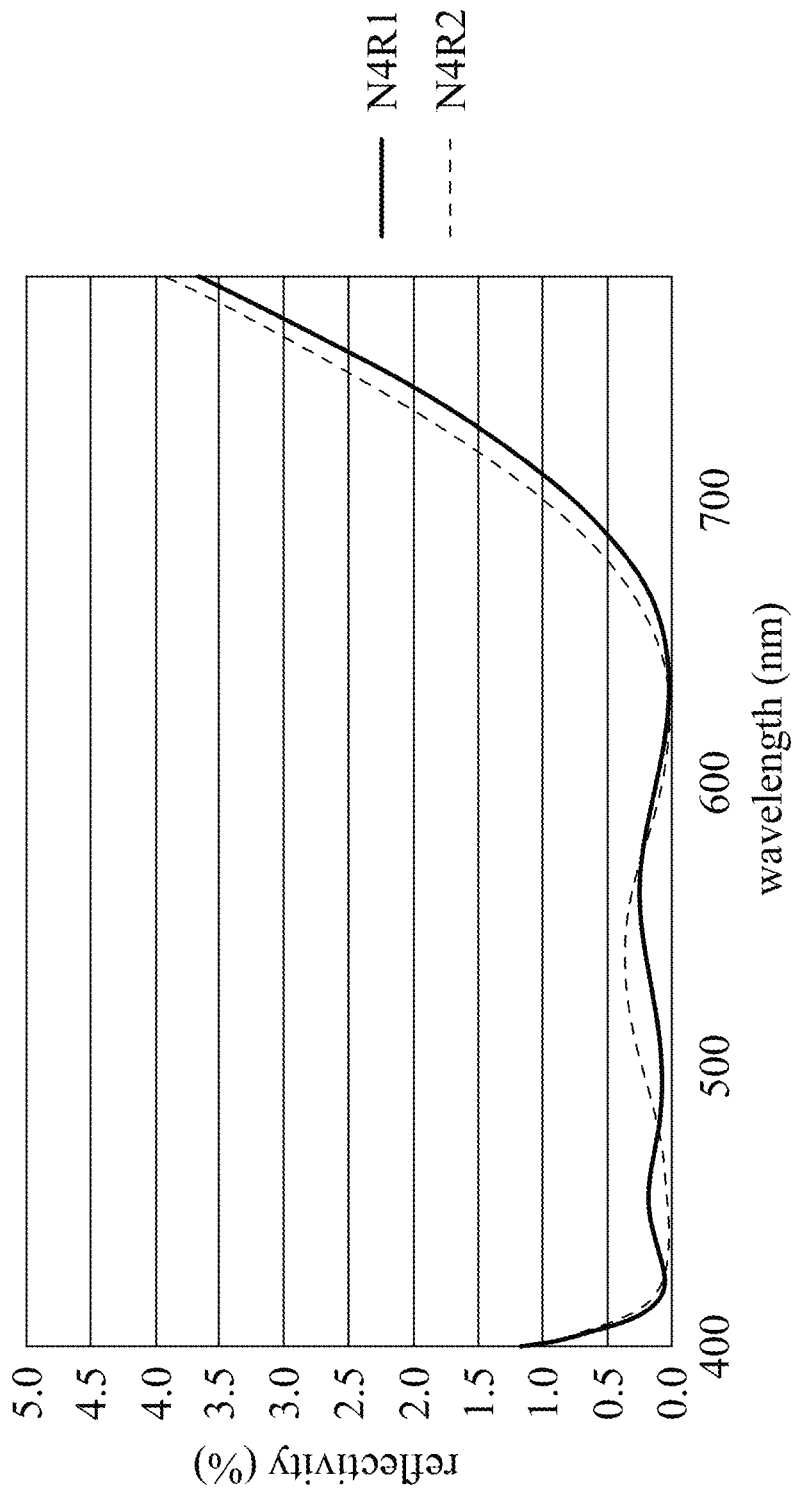
Figure 1E:
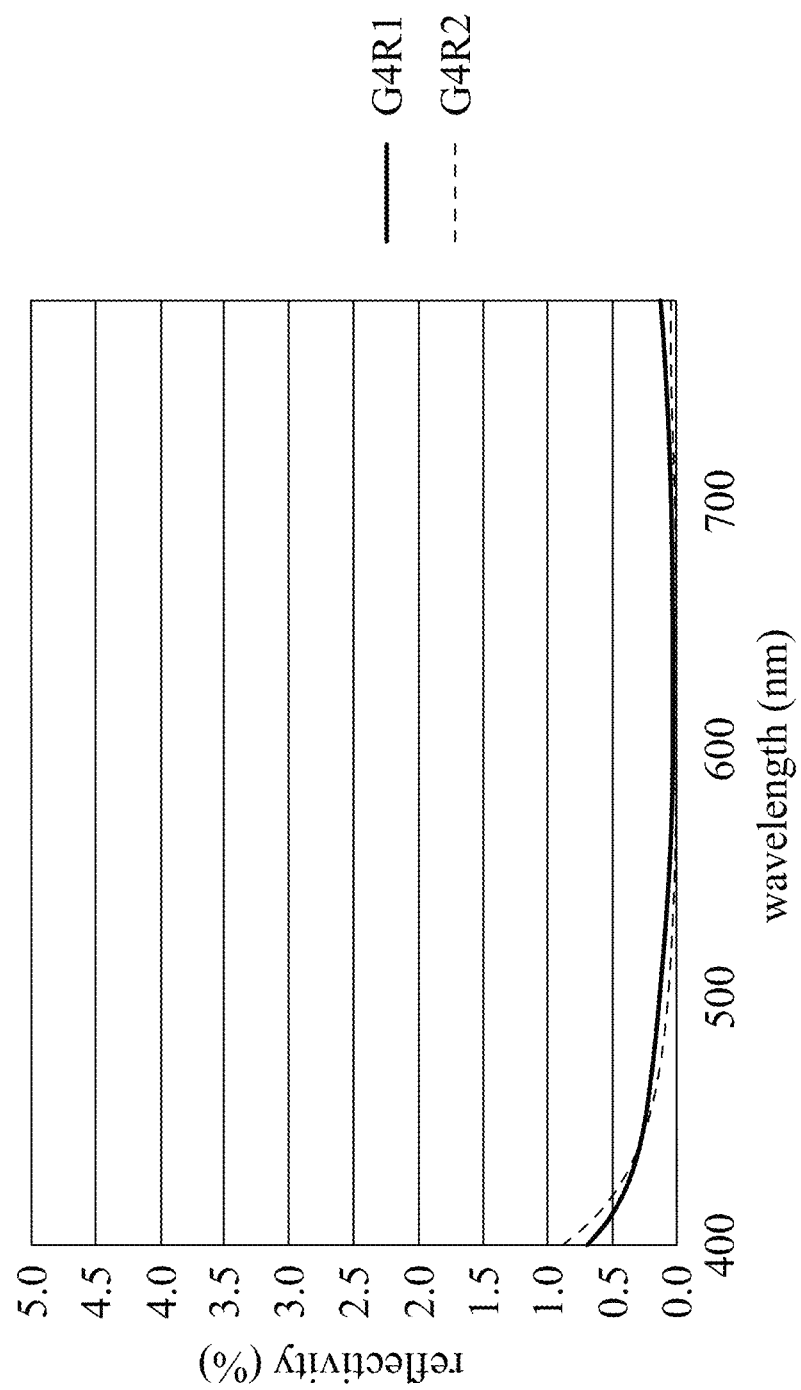

FIG. 1D shows a schematic view of parameters of reflectivity of each of an object-side surface and an image-side surface of the glass lens elements 150 without disposing anti-reflective membrane layers according to the 1st embodiment in FIG. 1B. FIG. 1E shows a schematic view of parameters of reflectivity of each of the object-side surface and the image-side surface of the glass lens elements 150 with disposing the anti-reflective membrane layers 151, 152 according to the 1st embodiment in FIG. 1B. As shown in FIG. 1D, reflectivity of each of the object-side surface and the image-side surface of the glass lens elements 150 without disposing anti-reflective membrane layers is N4R1 and N4R2, respectively. As shown in FIG. 1E, reflectivity of each of the object-side surface (that is, a surface with disposing the anti-reflective membrane layer 151) and the image-side surface (that is, a surface with disposing the anti-reflective membrane layer 152) of the glass lens elements 150 with disposing the anti-reflective membrane layers 151, 152 is G4R1 and G4R2, respectively. The parameters of reflectivity N4R1, N4R2, G4R1 and G4R2 of the glass lens element 150 corresponding to wavelengths are shown in the following Table 1.

TABLE 1 reflectivity of the glass lens element 150 of the 1st embodiment

| wavelength (nm) | N4R1 (%) | N4R2 (%) | G4R1 (%) | G4R2 (%) |
|---|---|---|---|---|
| 400 | 1.2 | 1.1 | 0.7 | 0.9 |
| 401 | 1.0 | 1.0 | 0.7 | 0.9 |
| 402 | 0.9 | 0.9 | 0.7 | 0.8 |
| 403 | 0.8 | 0.8 | 0.6 | 0.8 |
| 404 | 0.7 | 0.7 | 0.6 | 0.8 |
| 405 | 0.6 | 0.6 | 0.6 | 0.8 |
| 406 | 0.5 | 0.6 | 0.6 | 0.7 |
| 407 | 0.5 | 0.5 | 0.6 | 0.7 |
| 408 | 0.4 | 0.5 | 0.6 | 0.7 |
| 409 | 0.3 | 0.4 | 0.6 | 0.7 |
| 410 | 0.3 | 0.4 | 0.5 | 0.7 |
| 411 | 0.2 | 0.3 | 0.5 | 0.6 |
| 412 | 0.2 | 0.3 | 0.5 | 0.6 |
| 413 | 0.2 | 0.2 | 0.5 | 0.6 |
| 414 | 0.1 | 0.2 | 0.5 | 0.6 |
| 415 | 0.1 | 0.2 | 0.5 | 0.6 |
| 416 | 0.1 | 0.2 | 0.5 | 0.6 |
| 417 | 0.1 | 0.1 | 0.5 | 0.5 |
| 418 | 0.1 | 0.1 | 0.5 | 0.5 |
| 419 | 0.1 | 0.1 | 0.5 | 0.5 |
| 420 | 0.1 | 0.1 | 0.4 | 0.5 |
| 421 | 0.1 | 0.1 | 0.4 | 0.5 |
| 422 | 0.1 | 0.1 | 0.4 | 0.5 |
| 423 | 0.1 | 0.1 | 0.4 | 0.5 |
| 424 | 0.1 | 0.0 | 0.4 | 0.5 |
| 425 | 0.1 | 0.0 | 0.4 | 0.4 |
| 426 | 0.1 | 0.0 | 0.4 | 0.4 |
| 427 | 0.1 | 0.0 | 0.4 | 0.4 |
| 428 | 0.1 | 0.0 | 0.4 | 0.4 |
| 429 | 0.1 | 0.0 | 0.4 | 0.4 |
| 430 | 0.1 | 0.0 | 0.4 | 0.4 |
| 431 | 0.1 | 0.0 | 0.4 | 0.4 |
| 432 | 0.1 | 0.0 | 0.4 | 0.4 |
| 433 | 0.1 | 0.0 | 0.4 | 0.4 |
| 434 | 0.1 | 0.0 | 0.3 | 0.4 |
| 435 | 0.1 | 0.0 | 0.3 | 0.3 |
| 436 | 0.1 | 0.0 | 0.3 | 0.3 |
| 437 | 0.1 | 0.0 | 0.3 | 0.3 |
| 438 | 0.1 | 0.0 | 0.3 | 0.3 |
| 439 | 0.1 | 0.0 | 0.3 | 0.3 |
| 440 | 0.1 | 0.0 | 0.3 | 0.3 |
| 441 | 0.1 | 0.0 | 0.3 | 0.3 |
| 442 | 0.1 | 0.0 | 0.3 | 0.3 |
| 443 | 0.2 | 0.0 | 0.3 | 0.3 |
| 444 | 0.2 | 0.0 | 0.3 | 0.3 |
| 445 | 0.2 | 0.0 | 0.3 | 0.2 |
| 446 | 0.2 | 0.0 | 0.3 | 0.2 |
| 447 | 0.2 | 0.0 | 0.3 | 0.2 |
| 448 | 0.2 | 0.0 | 0.3 | 0.2 |
| 449 | 0.2 | 0.0 | 0.3 | 0.2 |
| 450 | 0.2 | 0.0 | 0.3 | 0.2 |
| 451 | 0.2 | 0.0 | 0.2 | 0.2 |
| 452 | 0.2 | 0.0 | 0.2 | 0.2 |
| 453 | 0.2 | 0.0 | 0.3 | 0.2 |
| 454 | 0.2 | 0.0 | 0.2 | 0.2 |
| 455 | 0.2 | 0.0 | 0.2 | 0.2 |
| 456 | 0.2 | 0.0 | 0.2 | 0.2 |
| 457 | 0.2 | 0.0 | 0.2 | 0.2 |
| 458 | 0.2 | 0.0 | 0.2 | 0.2 |
| 459 | 0.2 | 0.0 | 0.2 | 0.2 |
| 460 | 0.2 | 0.0 | 0.2 | 0.2 |
| 461 | 0.2 | 0.1 | 0.2 | 0.2 |
| 462 | 0.2 | 0.0 | 0.2 | 0.2 |
| 463 | 0.2 | 0.1 | 0.2 | 0.2 |
| 464 | 0.1 | 0.1 | 0.2 | 0.2 |
| 465 | 0.1 | 0.1 | 0.2 | 0.2 |
| 466 | 0.1 | 0.1 | 0.2 | 0.2 |
| 467 | 0.1 | 0.1 | 0.2 | 0.1 |
| 468 | 0.1 | 0.1 | 0.2 | 0.1 |

TABLE 1-continued reflectivity of the glass lens element 150 of the 1st embodiment

| wavelength (nm) | N4R1 (%) | N4R2 (%) | G4R1 (%) | G4R2 (%) |
|---|---|---|---|---|
| 469 | 0.1 | 0.1 | 0.2 | 0.1 |
| 470 | 0.1 | 0.1 | 0.2 | 0.1 |
| 471 | 0.1 | 0.1 | 0.2 | 0.1 |
| 472 | 0.1 | 0.1 | 0.2 | 0.1 |
| 473 | 0.1 | 0.1 | 0.2 | 0.1 |
| 474 | 0.1 | 0.1 | 0.2 | 0.1 |
| 475 | 0.1 | 0.1 | 0.2 | 0.1 |
| 476 | 0.1 | 0.1 | 0.2 | 0.1 |
| 477 | 0.1 | 0.1 | 0.2 | 0.1 |
| 478 | 0.1 | 0.1 | 0.2 | 0.1 |
| 479 | 0.1 | 0.1 | 0.2 | 0.1 |
| 480 | 0.1 | 0.1 | 0.2 | 0.1 |
| 481 | 0.1 | 0.1 | 0.2 | 0.1 |
| 482 | 0.1 | 0.1 | 0.2 | 0.1 |
| 483 | 0.1 | 0.1 | 0.2 | 0.1 |
| 484 | 0.1 | 0.2 | 0.2 | 0.1 |
| 485 | 0.1 | 0.2 | 0.2 | 0.1 |
| 486 | 0.1 | 0.2 | 0.2 | 0.1 |
| 487 | 0.1 | 0.2 | 0.2 | 0.1 |
| 488 | 0.1 | 0.2 | 0.2 | 0.1 |
| 489 | 0.1 | 0.2 | 0.2 | 0.1 |
| 490 | 0.1 | 0.2 | 0.2 | 0.1 |
| 491 | 0.1 | 0.2 | 0.1 | 0.1 |
| 492 | 0.1 | 0.2 | 0.2 | 0.1 |
| 493 | 0.1 | 0.2 | 0.1 | 0.1 |
| 494 | 0.1 | 0.2 | 0.1 | 0.1 |
| 495 | 0.1 | 0.2 | 0.1 | 0.1 |
| 496 | 0.1 | 0.2 | 0.1 | 0.1 |
| 497 | 0.1 | 0.2 | 0.1 | 0.1 |
| 498 | 0.1 | 0.2 | 0.1 | 0.1 |
| 499 | 0.1 | 0.2 | 0.1 | 0.1 |
| 500 | 0.1 | 0.2 | 0.1 | 0.1 |
| 501 | 0.1 | 0.3 | 0.1 | 0.1 |
| 502 | 0.1 | 0.3 | 0.1 | 0.1 |
| 503 | 0.1 | 0.3 | 0.1 | 0.1 |
| 504 | 0.1 | 0.3 | 0.1 | 0.1 |
| 505 | 0.1 | 0.3 | 0.1 | 0.1 |
| 506 | 0.1 | 0.3 | 0.1 | 0.1 |
| 507 | 0.1 | 0.3 | 0.1 | 0.1 |
| 508 | 0.1 | 0.3 | 0.1 | 0.1 |
| 509 | 0.1 | 0.3 | 0.1 | 0.1 |
| 510 | 0.1 | 0.3 | 0.1 | 0.1 |
| 511 | 0.1 | 0.3 | 0.1 | 0.1 |
| 512 | 0.1 | 0.3 | 0.1 | 0.1 |
| 513 | 0.1 | 0.3 | 0.1 | 0.1 |
| 514 | 0.1 | 0.3 | 0.1 | 0.0 |
| 515 | 0.1 | 0.3 | 0.1 | 0.0 |
| 516 | 0.1 | 0.3 | 0.1 | 0.0 |
| 517 | 0.1 | 0.3 | 0.1 | 0.0 |
| 518 | 0.1 | 0.3 | 0.1 | 0.0 |
| 519 | 0.1 | 0.3 | 0.1 | 0.0 |
| 520 | 0.1 | 0.3 | 0.1 | 0.0 |
| 521 | 0.1 | 0.3 | 0.1 | 0.0 |
| 522 | 0.1 | 0.3 | 0.1 | 0.0 |
| 523 | 0.1 | 0.3 | 0.1 | 0.0 |
| 524 | 0.1 | 0.4 | 0.1 | 0.0 |
| 525 | 0.2 | 0.4 | 0.1 | 0.0 |
| 526 | 0.2 | 0.4 | 0.1 | 0.0 |
| 527 | 0.2 | 0.4 | 0.1 | 0.0 |
| 528 | 0.2 | 0.4 | 0.1 | 0.0 |
| 529 | 0.2 | 0.4 | 0.1 | 0.0 |
| 530 | 0.2 | 0.4 | 0.1 | 0.0 |
| 531 | 0.2 | 0.4 | 0.1 | 0.0 |
| 532 | 0.2 | 0.4 | 0.1 | 0.0 |
| 533 | 0.2 | 0.4 | 0.1 | 0.0 |
| 534 | 0.2 | 0.4 | 0.1 | 0.0 |
| 535 | 0.2 | 0.4 | 0.1 | 0.0 |
| 536 | 0.2 | 0.4 | 0.1 | 0.0 |
| 537 | 0.2 | 0.4 | 0.1 | 0.0 |
| 538 | 0.2 | 0.4 | 0.1 | 0.0 |
| 539 | 0.2 | 0.4 | 0.1 | 0.0 |
| 540 | 0.2 | 0.4 | 0.1 | 0.0 |
| 541 | 0.2 | 0.4 | 0.1 | 0.0 |
| 542 | 0.2 | 0.4 | 0.1 | 0.0 |
| 543 | 0.2 | 0.4 | 0.1 | 0.0 |
| 544 | 0.2 | 0.4 | 0.1 | 0.0 |
| 545 | 0.2 | 0.4 | 0.1 | 0.0 |
| 546 | 0.2 | 0.4 | 0.1 | 0.0 |
| 547 | 0.2 | 0.4 | 0.1 | 0.0 |
| 548 | 0.2 | 0.3 | 0.1 | 0.0 |
| 549 | 0.2 | 0.3 | 0.1 | 0.0 |
| 550 | 0.2 | 0.3 | 0.1 | 0.0 |
| 551 | 0.2 | 0.3 | 0.1 | 0.0 |
| 552 | 0.2 | 0.3 | 0.1 | 0.0 |
| 553 | 0.2 | 0.3 | 0.1 | 0.0 |
| 554 | 0.2 | 0.3 | 0.1 | 0.0 |
| 555 | 0.2 | 0.3 | 0.1 | 0.0 |
| 556 | 0.2 | 0.3 | 0.1 | 0.0 |
| 557 | 0.2 | 0.3 | 0.1 | 0.0 |
| 558 | 0.2 | 0.3 | 0.1 | 0.0 |
| 559 | 0.2 | 0.3 | 0.1 | 0.0 |
| 560 | 0.2 | 0.3 | 0.1 | 0.0 |
| 561 | 0.2 | 0.3 | 0.1 | 0.0 |
| 562 | 0.2 | 0.3 | 0.1 | 0.0 |
| 563 | 0.2 | 0.3 | 0.1 | 0.0 |
| 564 | 0.2 | 0.3 | 0.1 | 0.0 |
| 565 | 0.2 | 0.3 | 0.1 | 0.0 |
| 566 | 0.2 | 0.3 | 0.1 | 0.0 |
| 567 | 0.2 | 0.3 | 0.1 | 0.0 |
| 568 | 0.2 | 0.3 | 0.1 | 0.0 |
| 569 | 0.2 | 0.3 | 0.1 | 0.0 |
| 570 | 0.2 | 0.3 | 0.1 | 0.0 |
| 571 | 0.2 | 0.3 | 0.1 | 0.0 |
| 572 | 0.2 | 0.2 | 0.1 | 0.0 |
| 573 | 0.2 | 0.2 | 0.1 | 0.0 |
| 574 | 0.2 | 0.2 | 0.1 | 0.0 |
| 575 | 0.2 | 0.2 | 0.1 | 0.0 |
| 576 | 0.2 | 0.2 | 0.1 | 0.0 |
| 577 | 0.2 | 0.2 | 0.1 | 0.0 |
| 578 | 0.2 | 0.2 | 0.0 | 0.0 |
| 579 | 0.2 | 0.2 | 0.1 | 0.0 |
| 580 | 0.2 | 0.2 | 0.0 | 0.0 |
| 581 | 0.2 | 0.2 | 0.0 | 0.0 |
| 582 | 0.2 | 0.2 | 0.0 | 0.0 |
| 583 | 0.2 | 0.2 | 0.0 | 0.0 |
| 584 | 0.2 | 0.2 | 0.0 | 0.0 |
| 585 | 0.2 | 0.2 | 0.0 | 0.0 |
| 586 | 0.2 | 0.2 | 0.0 | 0.0 |
| 587 | 0.2 | 0.2 | 0.0 | 0.0 |
| 588 | 0.2 | 0.1 | 0.0 | 0.0 |
| 589 | 0.2 | 0.1 | 0.0 | 0.0 |
| 590 | 0.2 | 0.1 | 0.0 | 0.0 |
| 591 | 0.2 | 0.1 | 0.0 | 0.0 |
| 592 | 0.2 | 0.1 | 0.0 | 0.0 |
| 593 | 0.2 | 0.1 | 0.0 | 0.0 |
| 594 | 0.1 | 0.1 | 0.0 | 0.0 |
| 595 | 0.1 | 0.1 | 0.0 | 0.0 |
| 596 | 0.1 | 0.1 | 0.0 | 0.0 |
| 597 | 0.1 | 0.1 | 0.0 | 0.0 |
| 598 | 0.1 | 0.1 | 0.0 | 0.0 |
| 599 | 0.1 | 0.1 | 0.0 | 0.0 |
| 600 | 0.1 | 0.1 | 0.0 | 0.0 |
| 601 | 0.1 | 0.1 | 0.0 | 0.0 |
| 602 | 0.1 | 0.1 | 0.0 | 0.0 |
| 603 | 0.1 | 0.1 | 0.0 | 0.0 |
| 604 | 0.1 | 0.1 | 0.0 | 0.0 |
| 605 | 0.1 | 0.1 | 0.0 | 0.0 |
| 606 | 0.1 | 0.1 | 0.0 | 0.0 |
| 607 | 0.1 | 0.0 | 0.0 | 0.0 |
| 608 | 0.1 | 0.0 | 0.0 | 0.0 |
| 609 | 0.1 | 0.0 | 0.0 | 0.0 |
| 610 | 0.1 | 0.0 | 0.0 | 0.0 |
| 611 | 0.1 | 0.0 | 0.0 | 0.0 |
| 612 | 0.1 | 0.0 | 0.0 | 0.0 |
| 613 | 0.1 | 0.0 | 0.0 | 0.0 |
| 614 | 0.1 | 0.0 | 0.0 | 0.0 |
| 615 | 0.1 | 0.0 | 0.0 | 0.0 |
| 616 | 0.1 | 0.0 | 0.0 | 0.0 |
| 617 | 0.0 | 0.0 | 0.0 | 0.0 |
| 618 | 0.0 | 0.0 | 0.0 | 0.0 |

TABLE 1-continued reflectivity of the glass lens element 150 of the 1st embodiment

| wavelength (nm) | N4R1 (%) | N4R2 (%) | G4R1 (%) | G4R2 (%) |
|---|---|---|---|---|
| 619 | 0.0 | 0.0 | 0.0 | 0.0 |
| 620 | 0.0 | 0.0 | 0.0 | 0.0 |
| 621 | 0.0 | 0.0 | 0.0 | 0.0 |
| 622 | 0.0 | 0.0 | 0.0 | 0.0 |
| 623 | 0.0 | 0.0 | 0.0 | 0.0 |
| 624 | 0.0 | 0.0 | 0.0 | 0.0 |
| 625 | 0.0 | 0.0 | 0.0 | 0.0 |
| 626 | 0.0 | 0.0 | 0.0 | 0.0 |
| 627 | 0.0 | 0.0 | 0.0 | 0.0 |
| 628 | 0.0 | 0.0 | 0.0 | 0.0 |
| 629 | 0.0 | 0.0 | 0.0 | 0.0 |
| 630 | 0.0 | 0.0 | 0.0 | 0.0 |
| 631 | 0.0 | 0.0 | 0.0 | 0.0 |
| 632 | 0.0 | 0.0 | 0.0 | 0.0 |
| 633 | 0.0 | 0.0 | 0.0 | 0.0 |
| 634 | 0.0 | 0.0 | 0.0 | 0.0 |
| 635 | 0.0 | 0.0 | 0.0 | 0.0 |
| 636 | 0.0 | 0.0 | 0.0 | 0.0 |
| 637 | 0.0 | 0.0 | 0.0 | 0.0 |
| 638 | 0.0 | 0.0 | 0.0 | 0.0 |
| 639 | 0.0 | 0.0 | 0.0 | 0.0 |
| 640 | 0.0 | 0.0 | 0.0 | 0.0 |
| 641 | 0.0 | 0.0 | 0.0 | 0.0 |
| 642 | 0.0 | 0.1 | 0.0 | 0.0 |
| 643 | 0.0 | 0.1 | 0.0 | 0.0 |
| 644 | 0.0 | 0.1 | 0.0 | 0.0 |
| 645 | 0.0 | 0.1 | 0.0 | 0.0 |
| 646 | 0.0 | 0.1 | 0.0 | 0.0 |
| 647 | 0.0 | 0.1 | 0.0 | 0.0 |
| 648 | 0.0 | 0.1 | 0.0 | 0.0 |
| 649 | 0.0 | 0.1 | 0.0 | 0.0 |
| 650 | 0.0 | 0.1 | 0.0 | 0.0 |
| 651 | 0.1 | 0.1 | 0.0 | 0.0 |
| 652 | 0.1 | 0.1 | 0.0 | 0.0 |
| 653 | 0.1 | 0.1 | 0.0 | 0.0 |
| 654 | 0.1 | 0.1 | 0.0 | 0.0 |
| 655 | 0.1 | 0.2 | 0.0 | 0.0 |
| 656 | 0.1 | 0.2 | 0.0 | 0.0 |
| 657 | 0.1 | 0.2 | 0.0 | 0.0 |
| 658 | 0.1 | 0.2 | 0.0 | 0.0 |
| 659 | 0.1 | 0.2 | 0.0 | 0.0 |
| 660 | 0.1 | 0.2 | 0.0 | 0.0 |
| 661 | 0.1 | 0.2 | 0.0 | 0.0 |
| 662 | 0.1 | 0.2 | 0.0 | 0.0 |
| 663 | 0.1 | 0.2 | 0.0 | 0.0 |
| 664 | 0.1 | 0.3 | 0.0 | 0.0 |
| 665 | 0.2 | 0.3 | 0.0 | 0.0 |
| 666 | 0.2 | 0.3 | 0.0 | 0.0 |
| 667 | 0.2 | 0.3 | 0.0 | 0.0 |
| 668 | 0.2 | 0.3 | 0.0 | 0.0 |
| 669 | 0.2 | 0.3 | 0.0 | 0.0 |
| 670 | 0.2 | 0.3 | 0.0 | 0.0 |
| 671 | 0.2 | 0.4 | 0.0 | 0.0 |
| 672 | 0.2 | 0.4 | 0.0 | 0.0 |
| 673 | 0.2 | 0.4 | 0.0 | 0.0 |
| 674 | 0.3 | 0.4 | 0.0 | 0.0 |
| 675 | 0.3 | 0.4 | 0.0 | 0.0 |
| 676 | 0.3 | 0.4 | 0.0 | 0.0 |
| 677 | 0.3 | 0.5 | 0.0 | 0.0 |
| 678 | 0.3 | 0.5 | 0.0 | 0.0 |
| 679 | 0.3 | 0.5 | 0.0 | 0.0 |
| 680 | 0.4 | 0.5 | 0.0 | 0.0 |
| 681 | 0.4 | 0.5 | 0.0 | 0.0 |
| 682 | 0.4 | 0.6 | 0.0 | 0.0 |
| 683 | 0.4 | 0.6 | 0.0 | 0.0 |
| 684 | 0.4 | 0.6 | 0.0 | 0.0 |
| 685 | 0.4 | 0.6 | 0.0 | 0.0 |
| 686 | 0.5 | 0.6 | 0.0 | 0.0 |
| 687 | 0.5 | 0.7 | 0.0 | 0.0 |
| 688 | 0.5 | 0.7 | 0.0 | 0.0 |
| 689 | 0.5 | 0.7 | 0.0 | 0.0 |
| 690 | 0.5 | 0.7 | 0.0 | 0.0 |
| 691 | 0.6 | 0.8 | 0.0 | 0.0 |
| 692 | 0.6 | 0.8 | 0.0 | 0.0 |
| 693 | 0.6 | 0.8 | 0.0 | 0.0 |
| 694 | 0.6 | 0.8 | 0.0 | 0.0 |
| 695 | 0.6 | 0.9 | 0.0 | 0.0 |
| 696 | 0.7 | 0.9 | 0.0 | 0.0 |
| 697 | 0.7 | 0.9 | 0.0 | 0.0 |
| 698 | 0.7 | 0.9 | 0.0 | 0.0 |
| 699 | 0.7 | 1.0 | 0.0 | 0.0 |
| 700 | 0.8 | 1.0 | 0.0 | 0.0 |
| 701 | 0.8 | 1.0 | 0.0 | 0.0 |
| 702 | 0.8 | 1.0 | 0.0 | 0.0 |
| 703 | 0.8 | 1.1 | 0.0 | 0.0 |
| 704 | 0.9 | 1.1 | 0.0 | 0.0 |
| 705 | 0.9 | 1.1 | 0.0 | 0.0 |
| 706 | 0.9 | 1.2 | 0.0 | 0.0 |
| 707 | 0.9 | 1.2 | 0.0 | 0.0 |
| 708 | 1.0 | 1.2 | 0.0 | 0.0 |
| 709 | 1.0 | 1.2 | 0.0 | 0.0 |
| 710 | 1.0 | 1.3 | 0.0 | 0.0 |
| 711 | 1.0 | 1.3 | 0.0 | 0.0 |
| 712 | 1.1 | 1.3 | 0.0 | 0.0 |
| 713 | 1.1 | 1.4 | 0.0 | 0.0 |
| 714 | 1.1 | 1.4 | 0.1 | 0.0 |
| 715 | 1.2 | 1.4 | 0.1 | 0.0 |
| 716 | 1.2 | 1.5 | 0.1 | 0.0 |
| 717 | 1.2 | 1.5 | 0.1 | 0.0 |
| 718 | 1.2 | 1.5 | 0.1 | 0.0 |
| 719 | 1.3 | 1.5 | 0.1 | 0.0 |
| 720 | 1.3 | 1.6 | 0.1 | 0.0 |
| 721 | 1.3 | 1.6 | 0.1 | 0.0 |
| 722 | 1.4 | 1.6 | 0.1 | 0.0 |
| 723 | 1.4 | 1.7 | 0.1 | 0.0 |
| 724 | 1.4 | 1.7 | 0.1 | 0.0 |
| 725 | 1.5 | 1.7 | 0.1 | 0.0 |
| 726 | 1.5 | 1.8 | 0.1 | 0.0 |
| 727 | 1.5 | 1.8 | 0.1 | 0.0 |
| 728 | 1.6 | 1.9 | 0.1 | 0.0 |
| 729 | 1.6 | 1.9 | 0.1 | 0.0 |
| 730 | 1.6 | 1.9 | 0.1 | 0.0 |
| 731 | 1.7 | 2.0 | 0.1 | 0.0 |
| 732 | 1.7 | 2.0 | 0.1 | 0.0 |
| 733 | 1.7 | 2.0 | 0.1 | 0.0 |
| 734 | 1.8 | 2.1 | 0.1 | 0.0 |
| 735 | 1.8 | 2.1 | 0.1 | 0.0 |
| 736 | 1.8 | 2.1 | 0.1 | 0.0 |
| 737 | 1.9 | 2.2 | 0.1 | 0.0 |
| 738 | 1.9 | 2.2 | 0.1 | 0.0 |
| 739 | 2.0 | 2.2 | 0.1 | 0.0 |
| 740 | 2.0 | 2.3 | 0.1 | 0.0 |
| 741 | 2.0 | 2.3 | 0.1 | 0.0 |
| 742 | 2.1 | 2.4 | 0.1 | 0.0 |
| 743 | 2.1 | 2.4 | 0.1 | 0.0 |
| 744 | 2.1 | 2.4 | 0.1 | 0.0 |
| 745 | 2.2 | 2.5 | 0.1 | 0.0 |
| 746 | 2.2 | 2.5 | 0.1 | 0.0 |
| 747 | 2.3 | 2.6 | 0.1 | 0.0 |
| 748 | 2.3 | 2.6 | 0.1 | 0.0 |
| 749 | 2.3 | 2.6 | 0.1 | 0.0 |
| 750 | 2.4 | 2.7 | 0.1 | 0.0 |
| 751 | 2.4 | 2.7 | 0.1 | 0.0 |
| 752 | 2.5 | 2.8 | 0.1 | 0.0 |
| 753 | 2.5 | 2.8 | 0.1 | 0.0 |
| 754 | 2.5 | 2.8 | 0.1 | 0.0 |
| 755 | 2.6 | 2.9 | 0.1 | 0.0 |
| 756 | 2.6 | 2.9 | 0.1 | 0.0 |
| 757 | 2.7 | 3.0 | 0.1 | 0.0 |
| 758 | 2.7 | 3.0 | 0.1 | 0.0 |
| 759 | 2.8 | 3.0 | 0.1 | 0.0 |
| 760 | 2.8 | 3.1 | 0.1 | 0.1 |
| 761 | 2.8 | 3.1 | 0.1 | 0.1 |
| 762 | 2.9 | 3.2 | 0.1 | 0.1 |
| 763 | 2.9 | 3.2 | 0.1 | 0.1 |
| 764 | 3.0 | 3.2 | 0.1 | 0.1 |
| 765 | 3.0 | 3.3 | 0.1 | 0.1 |
| 766 | 3.1 | 3.3 | 0.1 | 0.1 |
| 767 | 3.1 | 3.4 | 0.1 | 0.1 |
| 768 | 3.1 | 3.4 | 0.1 | 0.1 |

TABLE 1-continued reflectivity of the glass lens element 150 of the 1st embodiment

| wavelength (nm) | N4R1 (%) | N4R2 (%) | G4R1 (%) | G4R2 (%) |
|---|---|---|---|---|
| 769 | 3.2 | 3.5 | 0.1 | 0.1 |
| 770 | 3.2 | 3.5 | 0.1 | 0.1 |
| 771 | 3.3 | 3.5 | 0.1 | 0.1 |
| 772 | 3.3 | 3.6 | 0.1 | 0.1 |
| 773 | 3.4 | 3.6 | 0.1 | 0.1 |
| 774 | 3.4 | 3.7 | 0.1 | 0.1 |
| 775 | 3.5 | 3.7 | 0.1 | 0.1 |
| 776 | 3.5 | 3.8 | 0.1 | 0.1 |
| 777 | 3.5 | 3.8 | 0.1 | 0.1 |
| 778 | 3.6 | 3.8 | 0.1 | 0.1 |
| 779 | 3.6 | 3.9 | 0.1 | 0.1 |
| 780 | 3.7 | 3.9 | 0.1 | 0.1 |
| 781 | 3.7 | 4.0 | 0.1 | 0.1 |
| 782 | 3.8 | 4.0 | 0.1 | 0.1 |
| 783 | 3.8 | 4.1 | 0.1 | 0.1 |
| 784 | 3.9 | 4.1 | 0.1 | 0.1 |
| 785 | 3.9 | 4.1 | 0.1 | 0.1 |
| 786 | 4.0 | 4.2 | 0.1 | 0.1 |
| 787 | 4.0 | 4.2 | 0.1 | 0.1 |
| 788 | 4.1 | 4.3 | 0.1 | 0.1 |
| 789 | 4.1 | 4.3 | 0.1 | 0.1 |
| 790 | 4.1 | 4.4 | 0.1 | 0.1 |
| 791 | 4.2 | 4.4 | 0.1 | 0.1 |
| 792 | 4.2 | 4.4 | 0.1 | 0.1 |
| 793 | 4.3 | 4.5 | 0.1 | 0.1 |
| 794 | 4.3 | 4.5 | 0.1 | 0.1 |
| 795 | 4.4 | 4.6 | 0.2 | 0.1 |
| 796 | 4.4 | 4.6 | 0.2 | 0.1 |
| 797 | 4.5 | 4.7 | 0.2 | 0.1 |
| 798 | 4.5 | 4.7 | 0.2 | 0.1 |
| 799 | 4.6 | 4.7 | 0.2 | 0.1 |
| 800 | 4.6 | 4.8 | 0.2 | 0.1 |
| 801 | 4.7 | 4.8 | 0.2 | 0.1 |
| 802 | 4.7 | 4.9 | 0.2 | 0.1 |
| 803 | 4.8 | 4.9 | 0.2 | 0.1 |
| 804 | 4.8 | 5.0 | 0.2 | 0.1 |
| 805 | 4.9 | 5.0 | 0.2 | 0.1 |
| 806 | 4.9 | 5.1 | 0.2 | 0.1 |
| 807 | 4.9 | 5.1 | 0.2 | 0.1 |
| 808 | 5.0 | 5.1 | 0.2 | 0.1 |
| 809 | 5.0 | 5.2 | 0.2 | 0.1 |
| 810 | 5.1 | 5.2 | 0.2 | 0.1 |
| 811 | 5.1 | 5.3 | 0.2 | 0.1 |
| 812 | 5.2 | 5.3 | 0.2 | 0.1 |
| 813 | 5.2 | 5.4 | 0.2 | 0.1 |
| 814 | 5.3 | 5.4 | 0.2 | 0.1 |
| 815 | 5.3 | 5.4 | 0.2 | 0.1 |
| 816 | 5.4 | 5.5 | 0.2 | 0.1 |
| 817 | 5.4 | 5.5 | 0.2 | 0.1 |
| 818 | 5.5 | 5.6 | 0.2 | 0.1 |
| 819 | 5.5 | 5.6 | 0.2 | 0.1 |
| 820 | 5.6 | 5.7 | 0.2 | 0.1 |
| 821 | 5.6 | 5.7 | 0.2 | 0.1 |
| 822 | 5.7 | 5.8 | 0.2 | 0.1 |
| 823 | 5.7 | 5.8 | 0.2 | 0.1 |
| 824 | 5.8 | 5.8 | 0.2 | 0.1 |
| 825 | 5.8 | 5.9 | 0.2 | 0.2 |
| 826 | 5.9 | 5.9 | 0.2 | 0.2 |
| 827 | 5.9 | 6.0 | 0.2 | 0.2 |
| 828 | 6.0 | 6.0 | 0.2 | 0.2 |
| 829 | 6.0 | 6.1 | 0.2 | 0.2 |
| 830 | 6.1 | 6.1 | 0.2 | 0.2 |
| 831 | 6.1 | 6.1 | 0.2 | 0.2 |
| 832 | 6.1 | 6.2 | 0.2 | 0.2 |
| 833 | 6.2 | 6.2 | 0.2 | 0.2 |
| 834 | 6.2 | 6.3 | 0.2 | 0.2 |
| 835 | 6.3 | 6.3 | 0.2 | 0.2 |
| 836 | 6.3 | 6.4 | 0.2 | 0.2 |
| 837 | 6.4 | 6.4 | 0.2 | 0.2 |
| 838 | 6.4 | 6.4 | 0.2 | 0.2 |
| 839 | 6.5 | 6.5 | 0.2 | 0.2 |
| 840 | 6.5 | 6.5 | 0.2 | 0.2 |
| 841 | 6.6 | 6.6 | 0.2 | 0.2 |
| 842 | 6.6 | 6.6 | 0.3 | 0.2 |
| 843 | 6.7 | 6.6 | 0.3 | 0.2 |
| 844 | 6.7 | 6.7 | 0.3 | 0.2 |
| 845 | 6.8 | 6.7 | 0.3 | 0.2 |
| 846 | 6.8 | 6.8 | 0.3 | 0.2 |
| 847 | 6.9 | 6.8 | 0.3 | 0.2 |
| 848 | 6.9 | 6.8 | 0.3 | 0.2 |
| 849 | 6.9 | 6.9 | 0.3 | 0.2 |
| 850 | 7.0 | 6.9 | 0.3 | 0.2 |
| 851 | 7.0 | 7.0 | 0.3 | 0.2 |
| 852 | 7.1 | 7.0 | 0.3 | 0.2 |
| 853 | 7.1 | 7.1 | 0.3 | 0.2 |
| 854 | 7.2 | 7.1 | 0.3 | 0.2 |
| 855 | 7.2 | 7.1 | 0.3 | 0.2 |
| 856 | 7.3 | 7.2 | 0.3 | 0.2 |
| 857 | 7.3 | 7.2 | 0.3 | 0.2 |
| 858 | 7.4 | 7.3 | 0.3 | 0.2 |
| 859 | 7.4 | 7.3 | 0.3 | 0.2 |
| 860 | 7.5 | 7.3 | 0.3 | 0.2 |
| 861 | 7.5 | 7.4 | 0.3 | 0.2 |
| 862 | 7.5 | 7.4 | 0.3 | 0.2 |
| 863 | 7.6 | 7.4 | 0.3 | 0.2 |
| 864 | 7.6 | 7.5 | 0.3 | 0.2 |
| 865 | 7.7 | 7.5 | 0.3 | 0.2 |
| 866 | 7.7 | 7.6 | 0.3 | 0.2 |
| 867 | 7.8 | 7.6 | 0.3 | 0.2 |
| 868 | 7.8 | 7.6 | 0.3 | 0.2 |
| 869 | 7.8 | 7.7 | 0.3 | 0.2 |
| 870 | 7.9 | 7.7 | 0.3 | 0.3 |
| 871 | 7.9 | 7.7 | 0.3 | 0.3 |
| 872 | 8.0 | 7.8 | 0.3 | 0.3 |
| 873 | 8.0 | 7.8 | 0.3 | 0.3 |
| 874 | 8.1 | 7.9 | 0.3 | 0.3 |
| 875 | 8.1 | 7.9 | 0.3 | 0.3 |
| 876 | 8.2 | 7.9 | 0.3 | 0.3 |
| 877 | 8.2 | 8.0 | 0.3 | 0.3 |
| 878 | 8.2 | 8.0 | 0.3 | 0.3 |
| 879 | 8.3 | 8.1 | 0.4 | 0.3 |
| 880 | 8.3 | 8.1 | 0.4 | 0.3 |
| 881 | 8.4 | 8.1 | 0.4 | 0.3 |
| 882 | 8.4 | 8.2 | 0.4 | 0.3 |
| 883 | 8.5 | 8.2 | 0.4 | 0.3 |
| 884 | 8.5 | 8.2 | 0.4 | 0.3 |
| 885 | 8.5 | 8.3 | 0.4 | 0.3 |
| 886 | 8.6 | 8.3 | 0.4 | 0.3 |
| 887 | 8.6 | 8.3 | 0.4 | 0.3 |
| 888 | 8.7 | 8.4 | 0.4 | 0.3 |
| 889 | 8.7 | 8.4 | 0.4 | 0.3 |
| 890 | 8.8 | 8.5 | 0.4 | 0.3 |
| 891 | 8.8 | 8.5 | 0.4 | 0.3 |
| 892 | 8.8 | 8.5 | 0.4 | 0.3 |
| 893 | 8.9 | 8.6 | 0.4 | 0.3 |
| 894 | 8.9 | 8.6 | 0.4 | 0.3 |
| 895 | 8.9 | 8.6 | 0.4 | 0.3 |
| 896 | 9.0 | 8.7 | 0.4 | 0.3 |
| 897 | 9.0 | 8.7 | 0.4 | 0.3 |
| 898 | 9.1 | 8.7 | 0.4 | 0.3 |
| 899 | 9.1 | 8.8 | 0.4 | 0.3 |
| 900 | 9.2 | 8.8 | 0.4 | 0.3 |
| 901 | 9.2 | 8.8 | 0.4 | 0.3 |
| 902 | 9.2 | 8.9 | 0.4 | 0.3 |
| 903 | 9.3 | 8.9 | 0.4 | 0.3 |
| 904 | 9.3 | 8.9 | 0.4 | 0.3 |
| 905 | 9.4 | 9.0 | 0.4 | 0.3 |
| 906 | 9.4 | 9.0 | 0.4 | 0.4 |
| 907 | 9.4 | 9.0 | 0.4 | 0.4 |
| 908 | 9.5 | 9.1 | 0.4 | 0.4 |
| 909 | 9.5 | 9.1 | 0.4 | 0.4 |
| 910 | 9.5 | 9.1 | 0.4 | 0.4 |
| 911 | 9.6 | 9.2 | 0.4 | 0.4 |
| 912 | 9.6 | 9.2 | 0.5 | 0.4 |
| 913 | 9.7 | 9.2 | 0.5 | 0.4 |
| 914 | 9.7 | 9.3 | 0.5 | 0.4 |
| 915 | 9.8 | 9.3 | 0.5 | 0.4 |
| 916 | 9.8 | 9.3 | 0.5 | 0.4 |
| 917 | 9.8 | 9.4 | 0.5 | 0.4 |
| 918 | 9.9 | 9.4 | 0.5 | 0.4 |

TABLE 1-continued reflectivity of the glass lens element 150 of the 1st embodiment

| wavelength (nm) | N4R1 (%) | N4R2 (%) | G4R1 (%) | G4R2 (%) |
|---|---|---|---|---|
| 919 | 9.9 | 9.4 | 0.5 | 0.4 |
| 920 | 9.9 | 9.5 | 0.5 | 0.4 |
| 921 | 10.0 | 9.5 | 0.5 | 0.4 |
| 922 | 10.0 | 9.5 | 0.5 | 0.4 |
| 923 | 10.1 | 9.6 | 0.5 | 0.4 |
| 924 | 10.1 | 9.6 | 0.5 | 0.4 |
| 925 | 10.1 | 9.6 | 0.5 | 0.4 |
| 926 | 10.1 | 9.6 | 0.5 | 0.4 |
| 927 | 10.2 | 9.7 | 0.5 | 0.4 |
| 928 | 10.2 | 9.7 | 0.5 | 0.4 |
| 929 | 10.3 | 9.7 | 0.5 | 0.4 |
| 930 | 10.3 | 9.8 | 0.5 | 0.4 |
| 931 | 10.3 | 9.8 | 0.5 | 0.4 |
| 932 | 10.4 | 9.8 | 0.5 | 0.4 |
| 933 | 10.4 | 9.8 | 0.5 | 0.4 |
| 934 | 10.5 | 9.9 | 0.5 | 0.4 |
| 935 | 10.5 | 9.9 | 0.5 | 0.4 |
| 936 | 10.6 | 10.0 | 0.5 | 0.5 |
| 937 | 10.6 | 10.0 | 0.5 | 0.5 |
| 938 | 10.6 | 10.0 | 0.5 | 0.5 |
| 939 | 10.7 | 10.0 | 0.5 | 0.5 |
| 940 | 10.8 | 10.1 | 0.5 | 0.5 |
| 941 | 10.8 | 10.1 | 0.6 | 0.5 |
| 942 | 10.8 | 10.1 | 0.6 | 0.5 |
| 943 | 10.8 | 10.2 | 0.6 | 0.5 |
| 944 | 10.8 | 10.2 | 0.6 | 0.5 |
| 945 | 10.9 | 10.2 | 0.6 | 0.5 |
| 946 | 10.9 | 10.2 | 0.6 | 0.5 |
| 947 | 10.9 | 10.3 | 0.6 | 0.5 |
| 948 | 10.9 | 10.3 | 0.6 | 0.5 |
| 949 | 11.0 | 10.3 | 0.6 | 0.5 |
| 950 | 11.0 | 10.4 | 0.6 | 0.5 |
| 951 | 11.1 | 10.4 | 0.6 | 0.5 |
| 952 | 11.1 | 10.4 | 0.6 | 0.5 |
| 953 | 11.1 | 10.4 | 0.6 | 0.5 |
| 954 | 11.2 | 10.5 | 0.6 | 0.5 |
| 955 | 11.2 | 10.5 | 0.6 | 0.5 |
| 956 | 11.2 | 10.5 | 0.6 | 0.5 |
| 957 | 11.2 | 10.5 | 0.6 | 0.5 |
| 958 | 11.3 | 10.6 | 0.6 | 0.5 |
| 959 | 11.3 | 10.6 | 0.6 | 0.5 |
| 960 | 11.4 | 10.6 | 0.6 | 0.5 |
| 961 | 11.4 | 10.7 | 0.6 | 0.5 |
| 962 | 11.4 | 10.7 | 0.6 | 0.5 |
| 963 | 11.4 | 10.7 | 0.6 | 0.5 |
| 964 | 11.5 | 10.7 | 0.6 | 0.6 |
| 965 | 11.5 | 10.7 | 0.6 | 0.6 |
| 966 | 11.5 | 10.8 | 0.6 | 0.5 |
| 967 | 11.6 | 10.8 | 0.6 | 0.6 |
| 968 | 11.6 | 10.8 | 0.7 | 0.6 |
| 969 | 11.6 | 10.9 | 0.7 | 0.6 |
| 970 | 11.7 | 10.9 | 0.7 | 0.6 |
| 971 | 11.7 | 10.9 | 0.7 | 0.6 |
| 972 | 11.7 | 10.9 | 0.7 | 0.6 |
| 973 | 11.7 | 10.9 | 0.7 | 0.6 |
| 974 | 11.8 | 11.0 | 0.7 | 0.6 |
| 975 | 11.8 | 11.0 | 0.7 | 0.6 |
| 976 | 11.8 | 11.0 | 0.7 | 0.6 |
| 977 | 11.9 | 11.0 | 0.7 | 0.6 |
| 978 | 11.9 | 11.1 | 0.7 | 0.6 |
| 979 | 11.9 | 11.1 | 0.7 | 0.6 |
| 980 | 11.9 | 11.1 | 0.7 | 0.6 |
| 981 | 12.0 | 11.1 | 0.7 | 0.6 |
| 982 | 12.0 | 11.2 | 0.7 | 0.6 |
| 983 | 12.0 | 11.2 | 0.7 | 0.6 |
| 984 | 12.1 | 11.2 | 0.7 | 0.6 |
| 985 | 12.1 | 11.2 | 0.7 | 0.6 |
| 986 | 12.1 | 11.2 | 0.7 | 0.6 |
| 987 | 12.1 | 11.2 | 0.7 | 0.6 |
| 988 | 12.2 | 11.3 | 0.7 | 0.6 |
| 989 | 12.2 | 11.3 | 0.7 | 0.6 |
| 990 | 12.2 | 11.3 | 0.7 | 0.6 |
| 991 | 12.3 | 11.4 | 0.7 | 0.6 |
| 992 | 12.3 | 11.4 | 0.7 | 0.7 |
| 993 | 12.3 | 11.4 | 0.7 | 0.6 |
| 994 | 12.3 | 11.4 | 0.7 | 0.7 |
| 995 | 12.3 | 11.4 | 0.7 | 0.7 |
| 996 | 12.4 | 11.4 | 0.8 | 0.7 |
| 997 | 12.4 | 11.5 | 0.8 | 0.7 |
| 998 | 12.4 | 11.5 | 0.8 | 0.7 |
| 999 | 12.5 | 11.5 | 0.8 | 0.7 |
| 1000 | 12.5 | 11.5 | 0.8 | 0.7 |
| 1001 | 12.5 | 11.5 | 0.8 | 0.7 |
| 1002 | 12.5 | 11.5 | 0.8 | 0.7 |
| 1003 | 12.5 | 11.5 | 0.8 | 0.7 |
| 1004 | 12.6 | 11.6 | 0.8 | 0.7 |
| 1005 | 12.6 | 11.6 | 0.8 | 0.7 |
| 1006 | 12.6 | 11.6 | 0.8 | 0.7 |
| 1007 | 12.6 | 11.7 | 0.8 | 0.7 |
| 1008 | 12.7 | 11.7 | 0.8 | 0.7 |
| 1009 | 12.7 | 11.7 | 0.8 | 0.7 |
| 1010 | 12.7 | 11.7 | 0.8 | 0.7 |
| 1011 | 12.7 | 11.7 | 0.8 | 0.7 |
| 1012 | 12.7 | 11.7 | 0.8 | 0.7 |
| 1013 | 12.8 | 11.8 | 0.8 | 0.7 |
| 1014 | 12.8 | 11.8 | 0.8 | 0.7 |
| 1015 | 12.8 | 11.8 | 0.8 | 0.7 |
| 1016 | 12.8 | 11.8 | 0.8 | 0.7 |
| 1017 | 12.8 | 11.8 | 0.8 | 0.7 |
| 1018 | 12.8 | 11.8 | 0.8 | 0.7 |
| 1019 | 12.9 | 11.8 | 0.8 | 0.7 |
| 1020 | 12.9 | 11.9 | 0.8 | 0.7 |
| 1021 | 12.9 | 11.9 | 0.8 | 0.7 |
| 1022 | 12.9 | 11.9 | 0.8 | 0.8 |
| 1023 | 12.9 | 11.9 | 0.8 | 0.8 |
| 1024 | 13.0 | 11.9 | 0.8 | 0.7 |
| 1025 | 13.0 | 11.9 | 0.8 | 0.8 |
| 1026 | 13.0 | 11.9 | 0.8 | 0.8 |
| 1027 | 13.0 | 12.0 | 0.9 | 0.8 |
| 1028 | 13.1 | 12.0 | 0.9 | 0.8 |
| 1029 | 13.1 | 12.0 | 0.9 | 0.8 |
| 1030 | 13.1 | 12.0 | 0.9 | 0.8 |
| 1031 | 13.1 | 12.0 | 0.8 | 0.8 |
| 1032 | 13.1 | 12.0 | 0.9 | 0.8 |
| 1033 | 13.1 | 12.0 | 0.9 | 0.8 |
| 1034 | 13.1 | 12.0 | 0.9 | 0.8 |
| 1035 | 13.2 | 12.1 | 0.9 | 0.8 |
| 1036 | 13.2 | 12.1 | 0.9 | 0.8 |
| 1037 | 13.2 | 12.1 | 0.9 | 0.8 |
| 1038 | 13.3 | 12.1 | 0.9 | 0.8 |
| 1039 | 13.3 | 12.1 | 0.9 | 0.8 |
| 1040 | 13.2 | 12.1 | 0.9 | 0.8 |
| 1041 | 13.2 | 12.1 | 0.9 | 0.8 |
| 1042 | 13.3 | 12.1 | 0.9 | 0.8 |
| 1043 | 13.3 | 12.1 | 0.9 | 0.8 |
| 1044 | 13.4 | 12.2 | 0.9 | 0.8 |
| 1045 | 13.3 | 12.2 | 0.9 | 0.8 |
| 1046 | 13.4 | 12.2 | 0.9 | 0.8 |
| 1047 | 13.3 | 12.2 | 0.9 | 0.8 |
| 1048 | 13.3 | 12.2 | 0.9 | 0.8 |
| 1049 | 13.2 | 12.1 | 0.9 | 0.8 |
| 1050 | 13.4 | 12.2 | 0.9 | 0.8 |

As shown in Table 1, an average value of reflectivity of each of the object-side surface and the image-side surface of the glass lens element 150 without disposing anti-reflective membrane layers in the wavelength region between 400 nm and 780 nm is 0.58% and 0.68%, respectively, and an average value of reflectivity $R_{avg}$ of each of the object-side surface and the image-side surface of the glass lens element 150 with disposing the anti-reflective membrane layers 151, 152 in the wavelength region between 400 nm and 780 nm is 0.13% and 0.09%, respectively. A maximum value of reflectivity $R_{abs}$ of each of the object-side surface and the image-side surface of the glass lens element 150 with disposing the anti-reflective membrane layers 151, 152 in the wavelength region between 400 nm and 780 nm is 0.7% and 0.9%, respectively. Via disposing the anti-reflective membrane layer, reflectivity of the glass lens element can be decreased effectively.

In the 1st embodiment, when a distance from a first side surface (an object-side surface of the glass lens element 120) to a second side surface (an image-side surface of the lens element 170) of the optical lens assembly 100 along the optical axis X is $D_{S1SL}$, a distance from the optical surface 153 to the second side surface along the optical axis X is $D_{SoSL}$, and a distance from an object-side surface of a first side lens element (that is, the glass lens element 120) of the optical lens assembly 100 to an image surface along the optical axis X is TL, the conditions related to the parameters can be satisfied as the following Table 2.

TABLE 2 the 1st embodiment

| | |
|---|---|
| $D_{S1SL}$ (mm) | 16.74 |
| $D_{SoSL}$ (mm) | 5.73 |
| $D_{SoS1}/D_{S1SL}$ | 0.342 |
| TL (mm) | 19.55 |

Moreover, for the glass lens element 120 of the 1st embodiment, an average structure height of a nanostructure layer of each of the anti-reflective membrane layers 121,122 is greater than or equal to 80 nm and less than or equal to 350 nm, and a thickness of the silicon dioxide layer of a structure connection film of each of the anti-reflective membrane layers 121,122 is greater than or equal to 20 nm and less than or equal to 150 nm. When the glass lens element 120 has the first average linear expansivity $\alpha_1$ in the temperature region between −30° C. to 70° C., a temperature coefficient of refractive index of the glass lens element 120 in the temperature region between −30° C. to 70° C. is dn/dt, and the structure connection film of each of the anti-reflective membrane layers 121,122 has a second average linear expansivity $\alpha_2$ in the temperature region between −30° C. to 70° C., the aforementioned parameters are satisfied as the following Table 3.

TABLE 3 the glass lens element 120 of the 1st embodiment

| | | | |
|---|---|---|---|
| $\alpha_1$ ($10^{-7}$/K) | 89 | dn/dt ($10^{-6}$/K) | 0.9~1.9 |
| anti-reflective membrane layer 121 | | anti-reflective membrane layer 122 | |
| $\alpha_2$ ($10^{-7}$/K) | 6.5 | $\alpha_2$ ($10^{-7}$/K) | 6.5 |
| $\alpha_1/\alpha_2$ | 13.7 | $\alpha_1/\alpha_2$ | 13.7 |

For the glass lens element 130 of the 1st embodiment, an average structure height of a nanostructure layer of each of the anti-reflective membrane layers 131, 132 is greater than or equal to 80 nm and less than or equal to 350 nm, and a thickness of the silicon dioxide layer of a structure connection film of each of the anti-reflective membrane layers 131, 132 is greater than or equal to 20 nm and less than or equal to 150 nm. When the glass lens element 130 has the first average linear expansivity $\alpha_1$ in the temperature region between −30° C. to 70° C., a temperature coefficient of refractive index of the glass lens element 130 in the temperature region between −30° C. to 70° C. is dn/dt, and the structure connection film of each of the anti-reflective membrane layers 131, 132 has a second average linear expansivity $\alpha_2$ in the temperature region between −30° C. to 70° C., the aforementioned parameters are satisfied as the following Table 4.

TABLE 4 the glass lens element 130 of the 1st embodiment

| | | | |
|---|---|---|---|
| $\alpha_1$ ($10^{-7}$/K) | 67 | dn/dt ($10^{-6}$/K) | 1.2~2.7 |
| anti-reflective membrane layer 131 | | anti-reflective membrane layer 132 | |
| $\alpha_2$ ($10^{-7}$/K) | 6.5 | $\alpha_2$ ($10^{-7}$/K) | 6.5 |
| $\alpha_1/\alpha_2$ | 10.3 | $\alpha_1/\alpha_2$ | 10.3 |

For the glass lens element 150 of the 1st embodiment, when the glass lens element 150 has the first average linear expansivity $\alpha_1$ in the temperature region between −30° C. to 70° C., each of the structure connection film of the anti-reflective membrane layer 151 and the structure connection film 1522 of the anti-reflective membrane layer 152 has a second average linear expansivity $\alpha_2$ in the temperature region between −30° C. to 70° C., and a temperature coefficient of refractive index of the glass lens element 150 in the temperature region between −30° C. to 70° C. is dn/dt, the aforementioned parameters are satisfied as the following Table 5.

TABLE 5 the glass lens element 150 of the 1st embodiment

| | | | |
|---|---|---|---|
| $\alpha_1$ ($10^{-7}$/K) | 60 | dn/dt ($10^{-6}$/K) | 4.4~5.0 |
| anti-reflective membrane layer 151 | | anti-reflective membrane layer 152 | |
| $\alpha_2$ ($10^{-7}$/K) | 6.5 | $\alpha_2$ ($10^{-7}$/K) | 6.5 |
| $\alpha_1/a_2$ | 9.2 | $\alpha_1/\alpha_2$ | 9.2 |

It is worthy to be mentioned that each of an average value of reflectivity $R_{avg}$ and a maximum value of reflectivity $R_{abs}$ of each of the optical surfaces of the glass lens elements 120, 130 in the wavelength region between 400 nm and 780 nm can be satisfied with the following conditions: $0\% \leq R_{avg} \leq 0.5\%$; and $0\% \leq R_{abs} \leq 1.0\%$. Moreover, optical surfaces of glass lens elements in the following 2nd to 6th embodiments are satisfied with the aforementioned conditions, and it will not be described again.

2nd Embodiment

Figure 2:
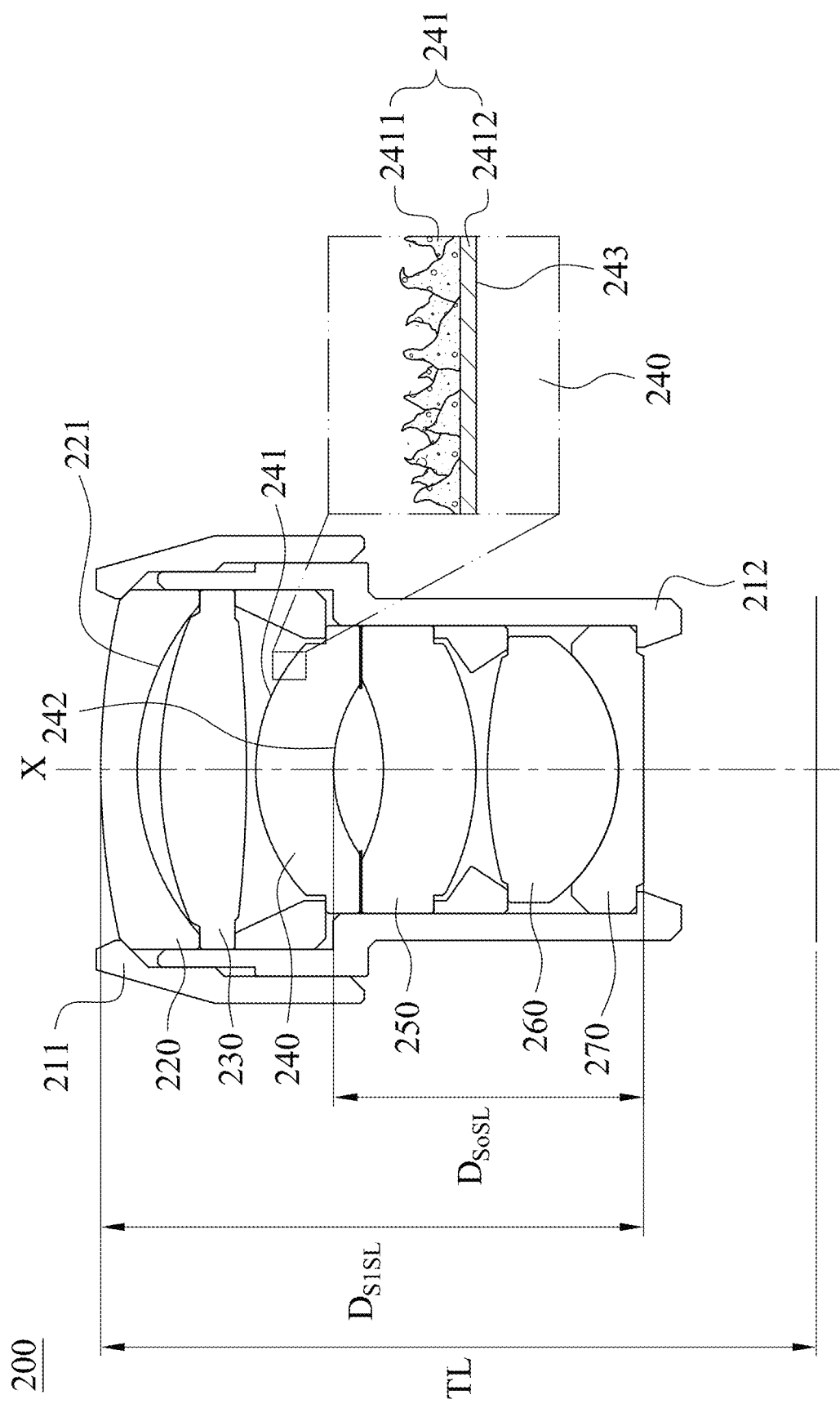
FIG. 2 shows a schematic view of an optical lens assembly of an optical module according to the 2nd embodiment of the present disclosure.

FIG. 2 shows a schematic view of an optical lens assembly 200 of an optical module according to the 2nd embodiment of the present disclosure. As shown in FIG. 2, an optical module (its reference numeral is omitted) includes a light source (not shown) and an optical lens assembly 200. An optical axis X passes through the optical lens assembly 200, and the optical lens assembly 200 includes a lens barrel (its reference numeral is omitted) and at least three lens elements. The at least three lens elements, which are, in order from an object side to an image side, a glass lens element 220, a lens element 230, a glass lens element 240 and lens elements 250, 260, 270 are disposed in the lens barrel, wherein the glass lens elements 220 is closer to the light source than the lens elements 230, 250, 260, 270, and the glass lens element 240 is closer to the light source than the lens elements 250, 260, 270 to the light source. Each of the glass lens elements 220, 240 and lens elements 230, 250, 260, 270 has refractive power, and optical surfaces of the glass lens elements 220, 240 and the lens elements 230, 250, 260, 270 are non-planar.

Moreover, an anti-reflective membrane layer 221 is formed on the optical surface of the glass lens element 220 (that is, an image-side surface of the glass lens element 220), anti-reflective membrane layers 241, 242 are formed on the optical surfaces of the glass lens element 240 (that is, two surfaces of the glass lens element 240), respectively. Take the anti-reflective membrane layer 241 of the glass lens element 240 for example, the anti-reflective membrane layer 241 of the glass lens element 240 is formed on the optical surface 243 of the glass lens element 240, and the anti-reflective membrane layer 241 includes a nanostructure layer 2411 and a structure connection film 2412. The nanostructure layer 2411 has a plurality of ridge-like protrusions extending non-directionally from the optical surface 243, a material of the nanostructure layer 2411 includes aluminum oxide, and an average structure height of the nanostructure layer 2411 is greater than or equal to 80 nm and less than or equal to 350 nm. The structure connection film 2412 is disposed between the optical surface 243 and the nanostructure layer 2411, the structure connection film 2412 includes at least one silicon dioxide layer (not shown), and the silicon dioxide layer contacts a bottom of the nanostructure layer 2411 physically, and a thickness of the silicon dioxide layer is greater than or equal to 20 nm and less than or equal to 150 nm.

As shown in FIG. 2, the optical lens assembly 200 can further include a cemented lens element. Specifically, in the 2nd embodiment, the lens elements 260, 270 are cemented to form a cemented lens element, and an image-side surface of the lens element 260 is cemented with an object-side surface of the lens element 270.

As shown in FIG. 2, the lens barrel includes a front cover 211 and a barrel body 212. The front cover 211 covers the barrel body 212. The glass lens element 220 contacts the front cover 211, the glass lens elements 220, 240 and the lens elements 230, 250, 260, 270 are accommodated in and contact the barrel body 212. Moreover, other optical elements such as a light blocking sheet, a spacer, a retainer and etc. can be disposed in the lens barrel on demand, but it will not be described herein.

In the 2nd embodiment, when a distance from a first side surface (an object-side surface of the glass lens element 220) to a second side surface (an image-side surface of the lens element 270) of the optical lens assembly 200 along the optical axis X is $D_{S1SL}$, a distance from the optical surface of the glass lens element 240 (an image-side surface of the glass lens element 240) to the second side surface along the optical axis X is $D_{SoSL}$, and a distance from an object-side surface of a first side lens element (that is, the glass lens element 220) of the optical lens assembly 200 to an image surface along the optical axis X is TL, the conditions related to the parameters can be satisfied as the following Table 6.

TABLE 6

| the 2nd embodiment | |
|---|---|
| $D_{S1SL}$ (mm) | 15.09 |
| $D_{SoSL}$ (mm) | 8.62 |
| $D_{SoSL}/D_{S1SL}$ | 0.571 |
| TL (mm) | 19.89 |

Moreover, for the glass lens element 220 of the 2nd embodiment, an average structure height of a nanostructure layer of the anti-reflective membrane layer 221 is greater than or equal to 80 nm and less than or equal to 350 nm, and a thickness of the silicon dioxide layer of a structure connection film of the anti-reflective membrane layer 221 is greater than or equal to 20 nm and less than or equal to 150 nm. When the glass lens element 220 has the first average linear expansivity $\alpha_1$ in the temperature region between −30° C. to 70° C., a temperature coefficient of refractive index of the glass lens element 220 in the temperature region between −30° C. to 70° C. is dn/dt, and the structure connection film of the anti-reflective membrane layers 221 has a second average linear expansivity $\alpha_2$ in the temperature region between −30° C. to 70° C., the aforementioned parameters are satisfied as the following Table 7.

TABLE 7

| the glass lens element 220 of the 2nd embodiment | | | |
|---|---|---|---|
| $\alpha_1$ ($10^{-7}$/K) | 90 | $\alpha_2$ ($10^{-7}$/K) | 6.5 |
| dn/dt ($10^{-6}$/K) | 0.1~0.7 | $\alpha_1/\alpha_2$ | 13.8 |

For the glass lens element 240 of the 2nd embodiment, when the glass lens element 240 has the first average linear expansivity $\alpha_1$ in the temperature region between −30° C. to 70° C., a temperature coefficient of refractive index of the glass lens element 240 in the temperature region between −30° C. to 70° C. is dn/dt, and each of the structure connection film 2412 of the anti-reflective membrane layer 241 and a structure connection film of the anti-reflective membrane layer 242 has a second average linear expansivity $\alpha_2$ in the temperature region between −30° C. to 70° C., the aforementioned parameters are satisfied as the following Table 8.

TABLE 8

| the glass lens element 240 of the 2nd embodiment | | | |
|---|---|---|---|
| $\alpha_1$ ($10^{-7}$/K) anti-reflective membrane layer 241 | 58 | dn/dt ($10^{-6}$/K) anti-reflective membrane layer 242 | 6.6~8.4 |
| $\alpha_2$ ($10^{-7}$/K) | 6.5 | $\alpha_2$ ($10^{-7}$/K) | 6.5 |
| $\alpha_1/\alpha_2$ | 8.9 | $\alpha_1/\alpha_2$ | 8.9 |

3rd Embodiment

Figure 3:
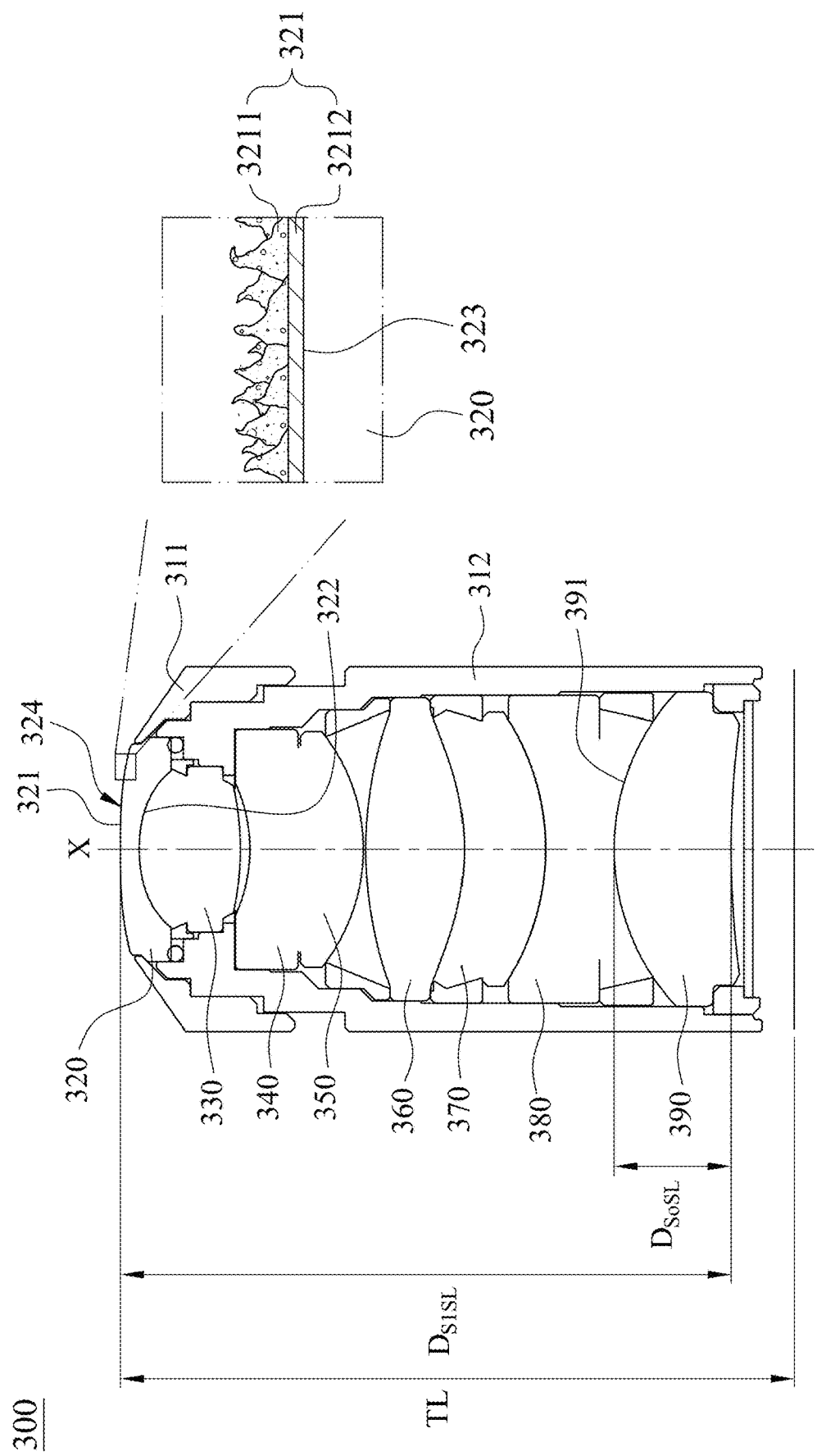
FIG. 3 shows a schematic view of an optical lens assembly of an optical module according to the 3rd embodiment of the present disclosure.

FIG. 3 shows a schematic view of an optical lens assembly 300 of an optical module according to the 3rd embodiment of the present disclosure. As shown in FIG. 3, an optical module (its reference numeral is omitted) includes a light source (not shown) and an optical lens assembly 300. An optical axis X passes through the optical lens assembly 300, and the optical lens assembly 300 includes a lens barrel (its reference numeral is omitted) and at least three lens elements. The at least three lens elements, which are, in order from an object side to an image side, a glass lens element 320, lens elements 330, 340, 350, 360, 370, 380 and a glass lens element 390 are disposed in the lens barrel, wherein the glass lens elements 320 is closer to the light source than the lens elements 330, 340, 350, 360, 370, 380 to the light source. Each of the glass lens elements 320, 390 and the lens elements 330, 340, 350, 360, 370, 380 has refractive power, and optical surfaces of the glass lens elements 320, 390 and the lens elements 330, 340, 350, 360, 370, 380 are non-planar.

Specifically, each of the glass lens element 320 and the lens element 360 is a molded glass lens element, and each of the lens elements 330, 340, 350, 370, 380 and the glass lens element 390 is a grinding glass lens element. In the 3rd embodiment, an optical surface of the glass lens element 320 has an inflection point 324, but the present disclosure is not limited thereto.

Moreover, anti-reflective membrane layers 321, 322 are formed on the optical surfaces of the glass lens element 320

(that is, two surfaces of the glass lens element 320), respectively, an anti-reflective membrane layer 391 is formed on an optical surface of the glass lens element 390 (that is, an object-side surface of the glass lens element 390). Take the anti-reflective membrane layer 321 of the glass lens element 320 for example, the anti-reflective membrane layer 321 of the glass lens element 320 is formed on the optical surface 323 of the glass lens element 320, and the anti-reflective membrane layer 321 includes a nanostructure layer 3211 and a structure connection film 3212. The nanostructure layer 3211 has a plurality of ridge-like protrusions extending non-directionally from the optical surface 323, a material of the nanostructure layer 3211 includes aluminum oxide, and an average structure height of the nanostructure layer 3211 is greater than or equal to 80 nm and less than or equal to 350 nm. The structure connection film 3212 is disposed between the optical surface 323 and the nanostructure layer 3211, the structure connection film 3212 includes at least one silicon dioxide layer (not shown), and the silicon dioxide layer contacts a bottom of the nanostructure layer 3211 physically, and a thickness of the silicon dioxide layer is greater than or equal to 20 nm and less than or equal to 150 nm.

As shown in FIG. 3, the optical lens assembly 300 can further include a cemented lens element. Specifically, in the 3rd embodiment, the glass lens elements 320 and the lens element 330 are cemented to form a cemented lens element, the lens elements 340, 350 are cemented to form a cemented lens element, the lens elements 360, 370, 380 and the glass lens element 390 are cemented to form a cemented lens element, wherein an image-side surface of the glass lens element 320 is cemented with an object-side surface of the lens element 330, an image-side surface of the lens element 340 is cemented with an object-side surface of the lens element 350, an image-side surface of the lens element 360 is cemented with an object-side surface of the lens element 370, an image-side surface of the lens element 370 is cemented with an object-side surface of the lens element 380, and an image-side surface of the lens element 380 is cemented with an object-side surface of the glass lens element 390.

As shown in FIG. 3, the lens barrel includes a front cover 311 and a barrel body 312. The front cover 311 covers the barrel body 312. The glass lens element 320 contacts the front cover 311, the glass lens elements 320, 390 and the lens elements 330, 340, 350, 360, 370, 380 are accommodated in and contact the barrel body 312. Moreover, other optical elements such as a light blocking sheet, a spacer, a retainer and etc. can be disposed in the lens barrel on demand, but it will not be described herein.

In the 3rd embodiment, when a distance from a first side surface (an object-side surface of the glass lens element 320) to a second side surface (an image-side surface of the glass lens element 390) of the optical lens assembly 300 along the optical axis X is $D_{S1SL}$, a distance from the optical surface of the glass lens element 390 (the object-side surface of the glass lens element 390) to the second side surface along the optical axis X is $D_{SoSL}$, and a distance from an object-side surface of a first side lens element (that is, the glass lens element 320) of the optical lens assembly 300 to an image surface along the optical axis X is TL, the conditions related to the parameters can be satisfied as the following Table 9.

TABLE 9

| the 3rd embodiment | |
|---|---|
| $D_{S1SL}$ (mm) | 27.19 |
| $D_{SoSL}$ (mm) | 5.2 |
| $D_{SoSL}/D_{S1SL}$ | 0.191 |
| TL (mm) | 30.01 |

Moreover, for the glass lens element 320 of the 3rd embodiment, when the glass lens element 320 has the first average linear expansivity $\alpha_1$ in the temperature region between −30° C. to 70° C., a temperature coefficient of refractive index of the glass lens element 320 in the temperature region between −30° C. to 70° C. is dn/dt, and each of the structure connection film 3212 of the anti-reflective membrane layers 321 and a structure connection film of the anti-reflective membrane layers 322 has a second average linear expansivity $\alpha_2$ in the temperature region between −30° C. to 70° C., the aforementioned parameters are satisfied as the following Table 10.

TABLE 10

| the glass lens element 320 of the 3rd embodiment | | | |
|---|---|---|---|
| $\alpha_1$ ($10^{-7}$/K) | 58 | dn/dt ($10^{-6}$/K) | 8.1~8.8 |
| anti-reflective membrane layer 321 | | anti-reflective membrane layer 322 | |
| $\alpha_2$ ($10^{-7}$/K) | 6.5 | $\alpha_2$ ($10^{-7}$/K) | 6.5 |
| $\alpha_1/\alpha_2$ | 8.9 | $\alpha_1/\alpha_2$ | 8.9 |

For the glass lens element 390 of the 3rd embodiment, an average structure height of a nanostructure layer of the anti-reflective membrane layer 391 is greater than or equal to 80 nm and less than or equal to 350 nm, and a thickness of the silicon dioxide layer of a structure connection film of the anti-reflective membrane layer 391 is greater than or equal to 20 nm and less than or equal to 150 nm. When the glass lens element 390 has the first average linear expansivity $\alpha_1$ in the temperature region between −30° C. to 70° C., a temperature coefficient of refractive index of the glass lens element 390 in the temperature region between −30° C. to 70° C. is dn/dt, and the structure connection film of the anti-reflective membrane layers 391 has a second average linear expansivity $\alpha_2$ in the temperature region between −30° C. to 70° C., the aforementioned parameters are satisfied as the following Table 11.

TABLE 11

| the glass lens element 390 of the 3rd embodiment | | | |
|---|---|---|---|
| $\alpha_1$ ($10^{-7}$/K) | 62 | $\alpha_2$ ($10^{-7}$/K) | 6.5 |
| dn/dt ($10^{-6}$/K) | 2.2~2.6 | $\alpha_1/\alpha_2$ | 9.5 |

4th Embodiment

Figure 4:
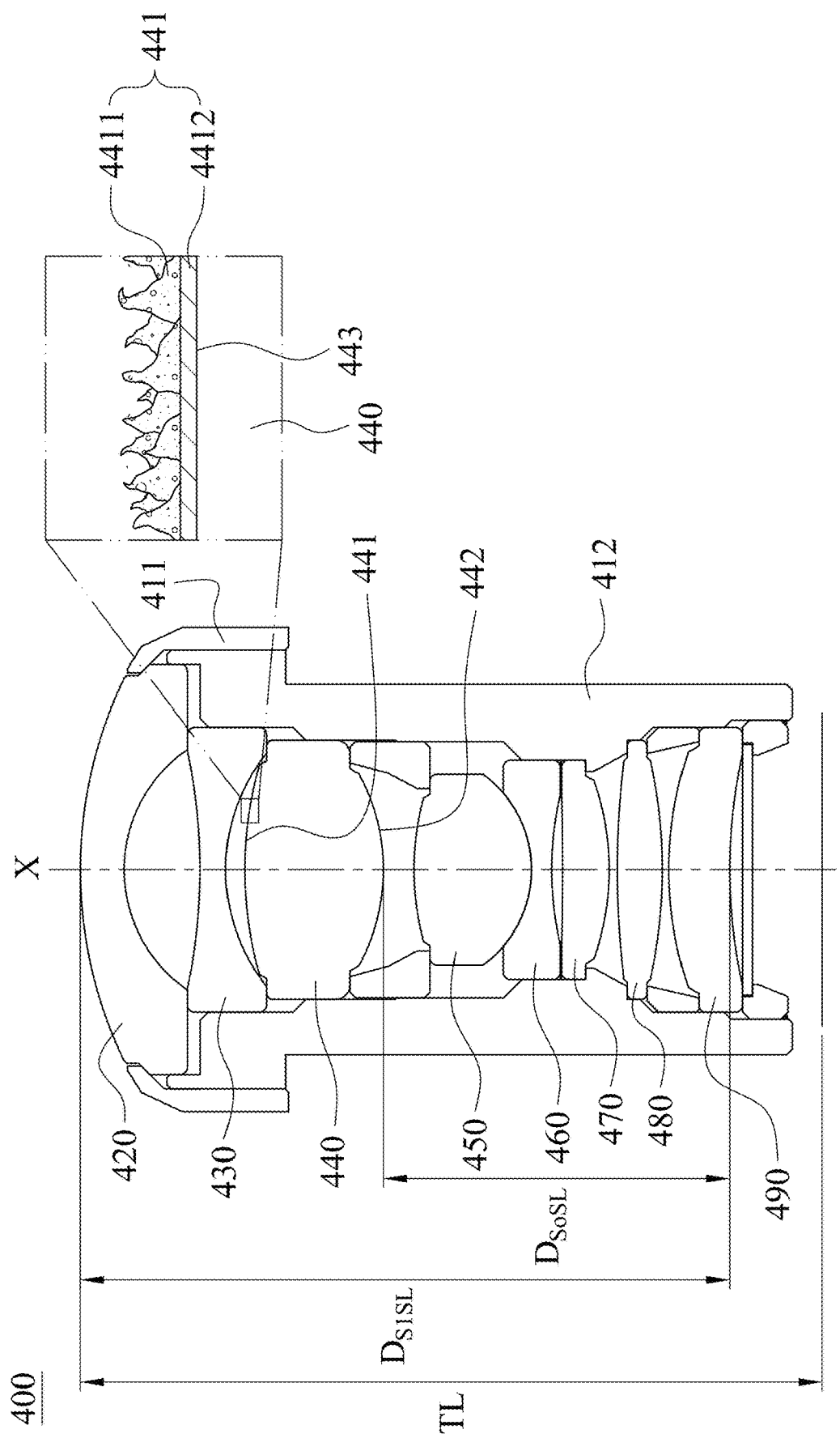
FIG. 4 shows a schematic view of an optical lens assembly of an optical module according to the 4th embodiment of the present disclosure.

FIG. 4 shows a schematic view of an optical lens assembly 400 of an optical module according to the 4th embodiment of the present disclosure. As shown in FIG. 4, an optical module (its reference numeral is omitted) includes a light source (not shown) and an optical lens assembly 400. An optical axis X passes through the optical lens assembly 400, and the optical lens assembly 400 includes a lens barrel (its reference numeral is omitted) and at least three lens elements. The at least three lens elements, which are, in order from an object side to an image side, lens elements 420, 430, a glass lens element 440 and lens elements 450, 460, 470, 480, 490 are disposed in the lens barrel, wherein the glass lens element 440 is closer to the light source than the lens elements 450, 460, 470, 480, 490 to the light source. Each of the lens elements 420, 430, 450, 460, 470, 480, 490 and the glass lens element 440 has refractive power, and optical surfaces of the lens elements 420, 430, 450, 460, 470, 480, 490 and the glass lens element 440 are non-planar.

Moreover, anti-reflective membrane layers 441, 442 are formed on the optical surfaces of the glass lens element 440 (that is, two surfaces of the glass lens element 440), respectively. Take the anti-reflective membrane layer 441 of the glass lens element 440 for example, the anti-reflective membrane layer 441 of the glass lens element 440 is formed on the optical surface 443 of the glass lens element 440, and the anti-reflective membrane layer 441 includes a nanostructure layer 4411 and a structure connection film 4412. The nanostructure layer 4411 has a plurality of ridge-like protrusions extending non-directionally from the optical surface 443, a material of the nanostructure layer 4411 includes aluminum oxide, and an average structure height of the nanostructure layer 4411 is greater than or equal to 80 nm and less than or equal to 350 nm. The structure connection film 4412 is disposed between the optical surface 443 and the nanostructure layer 4411, the structure connection film 4412 includes at least one silicon dioxide layer (not shown), and the silicon dioxide layer contacts a bottom of the nanostructure layer 4411 physically, and a thickness of the silicon dioxide layer is greater than or equal to 20 nm and less than or equal to 150 nm.

As shown in FIG. 4, the optical lens assembly 400 can further include a cemented lens element. Specifically, in the 4th embodiment, the lens elements 450, 460 are cemented to form a cemented lens element, and an image-side surface of the lens element 450 is cemented with an object-side surface of the lens element 460.

As shown in FIG. 4, the lens barrel includes a front cover 411 and a barrel body 412. The front cover 411 covers the barrel body 412. The lens element 420 contacts the front cover 411, the glass lens elements 440 and the lens elements 420, 430, 450, 460, 470, 480, 490 are accommodated in and contact the barrel body 412. Moreover, other optical elements such as a light blocking sheet, a spacer, a retainer and etc. can be disposed in the lens barrel on demand, but it will not be described herein.

In the 4th embodiment, when a distance from a first side surface (an object-side surface of the lens element 420) to a second side surface (an image-side surface of the lens element 490) of the optical lens assembly 400 along the optical axis X is $D_{S1SL}$, a distance from the optical surface of the glass lens element 440 (an image-side surface of the glass lens element 440) to the second side surface along the optical axis X is $D_{SoSL}$, and a distance from an object-side surface of a first side lens element (that is, the lens element 420) of the optical lens assembly 400 to an image surface along the optical axis X is TL, the conditions related to the parameters can be satisfied as the following Table 12.

TABLE 12

| the 4th embodiment | |
|---|---|
| $D_{S1SL}$ (mm) | 22.8 |
| $D_{SoSL}$ (mm) | 12.15 |
| $D_{SoSL}/D_{S1SL}$ | 0.533 |
| TL (mm) | 26.05 |

Moreover, when the glass lens element 440 has the first average linear expansivity $\alpha_1$ in the temperature region between −30° C. to 70° C., a temperature coefficient of refractive index of the glass lens element 440 in the temperature region between −30° C. to 70° C. is dn/dt, and each of the structure connection film 4412 of the anti-reflective membrane layers 441 and a structure connection film of the anti-reflective membrane layers 442 has a second average linear expansivity $\alpha_2$ in the temperature region between −30° C. to 70° C., the aforementioned parameters are satisfied as the following Table 13.

TABLE 13

| the glass lens element 440 of the 4th embodiment | | | |
|---|---|---|---|
| $\alpha_1$ ($10^{-7}$/K) | 88 | dn/dt ($10^{-6}$/K) | −0.1~1.0 |
| anti-reflective membrane layer 441 | | anti-reflective membrane layer 442 | |
| $\alpha_2$ ($10^{-7}$/K) | 6.5 | $\alpha_2$ ($10^{-7}$/K) | 6.5 |
| $\alpha_1/\alpha_2$ | 13.5 | $\alpha_1/\alpha_2$ | 13.5 |

5th Embodiment

Figure 5:
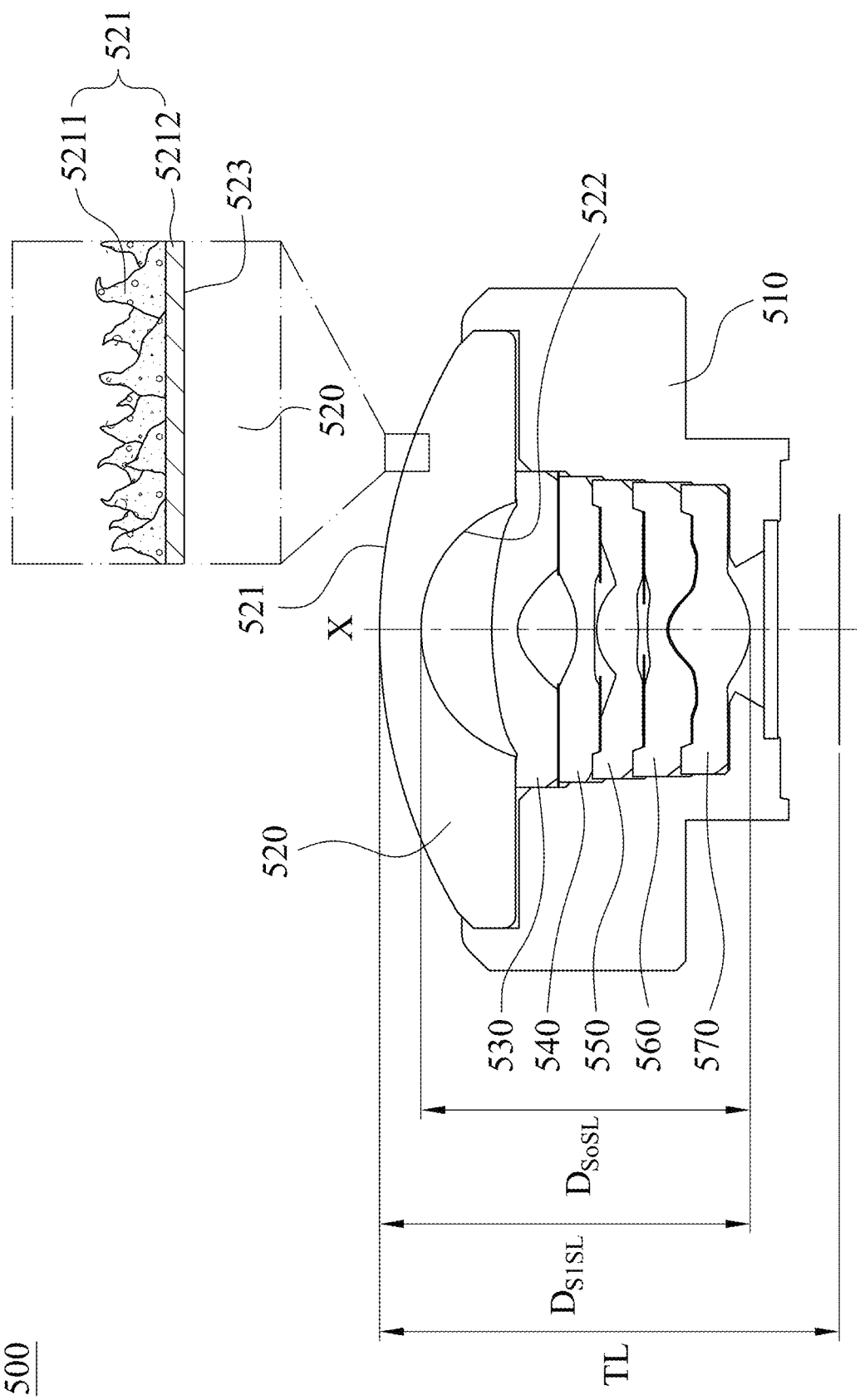
FIG. 5 shows a schematic view of an optical lens assembly of an optical module according to the 5th embodiment of the present disclosure.

FIG. 5 shows a schematic view of an optical lens assembly 500 of an optical module according to the 5th embodiment of the present disclosure. As shown in FIG. 5, an optical module (its reference numeral is omitted) includes a light source (not shown) and an optical lens assembly 500. An optical axis X passes through the optical lens assembly 500, and the optical lens assembly 500 includes a lens barrel 510 and at least three lens elements. The at least three lens elements, which are, in order from an object side to an image side, a glass lens element 520 and lens elements 530, 540, 550, 560, 570 are disposed in the lens barrel, wherein the glass lens element 520 is closer to the light source than the lens elements 530, 540, 550, 560, 570 to the light source. Each of the glass lens element 520 and the lens elements 530, 540, 550, 560, 570 has refractive power, and optical surfaces of the glass lens element 520 and the lens elements 530, 540, 550, 560, 570 are non-planar.

Moreover, anti-reflective membrane layers 521, 522 are formed on the optical surfaces of the glass lens element 520. Take the anti-reflective membrane layer 521 of the glass lens element 520 for example, the anti-reflective membrane layer 521 of the glass lens element 520 is formed on the optical surface 523 of the glass lens element 520, and the anti-reflective membrane layer 521 includes a nanostructure layer 5211 and a structure connection film 5212. The nanostructure layer 5211 has a plurality of ridge-like protrusions extending non-directionally from the optical surface 523, a material of the nanostructure layer 5211 includes aluminum oxide, and an average structure height of the nanostructure layer 5211 is greater than or equal to 80 nm and less than or equal to 350 nm. The structure connection film 5212 is disposed between the optical surface 523 and the nanostructure layer 5211, the structure connection film 5212 includes at least one silicon dioxide layer (not shown), and the silicon dioxide layer contacts a bottom of the nanostructure layer 5211 physically, and a thickness of the silicon dioxide layer is greater than or equal to 20 nm and less than or equal to 150 nm.

As shown in FIG. 5, the optical lens assembly 500 can further include a cemented lens element. Specifically, in the 5th embodiment, the lens elements 560, 570 are cemented to form a cemented lens element, and an image-side surface of the lens element 560 is cemented with an object-side surface of the lens element 570.

Furthermore, other optical elements such as a light blocking sheet, a spacer, a retainer and etc. can be disposed in the lens barrel 510 on demand, but it will not be described herein.

In the 5th embodiment, when a distance from a first side surface (an object-side surface of the glass lens element 520) to a second side surface (an image-side surface of the lens element 570) of the optical lens assembly 500 along the optical axis X is $D_{S1SL}$, a distance from the optical surface of the glass lens element 520 (an image-side surface of the glass lens element 520) to the second side surface along the optical axis X is $D_{SoSL}$, and a distance from an object-side surface of a first side lens element (that is, the glass lens element 520) of the optical lens assembly 500 to an image surface along the optical axis X is TL, the conditions related to the parameters can be satisfied as the following Table 14.

TABLE 14 the 5th embodiment

| | |
|---|---|
| $D_{S1SL}$ (mm) | 8.06 |
| $D_{SoSL}$ (mm) | 7.16 |
| $D_{SoSL}/D_{S1SL}$ | 0.888 |
| TL (mm) | 10 |

Moreover, when the glass lens element 520 has the first average linear expansivity $\alpha_1$ in the temperature region between −30° C. to 70° C., a temperature coefficient of refractive index of the glass lens element 520 in the temperature region between −30° C. to 70° C. is dn/dt, and each of the structure connection film 5212 of the anti-reflective membrane layers 521 and a structure connection film of the anti-reflective membrane layers 522 has a second average linear expansivity $\alpha_2$ in the temperature region between −30° C. to 70° C., the aforementioned parameters are satisfied as the following Table 15.

TABLE 15 the glass lens element 520 of the 5th embodiment

| $\alpha_1$ (10⁻⁷/K) | 72 | dn/dt (10⁻⁶/K) | 2.4~2.9 |
|---|---|---|---|
| anti-reflective membrane layer 521 | | anti-reflective membrane layer 522 | |
| $\alpha_2$ (10⁻⁷/K) | 6.5 | $\alpha_2$ (10⁻⁷/K) | 6.5 |
| $\alpha_1/\alpha_2$ | 11.1 | $\alpha_1/\alpha_2$ | 11.1 |

Furthermore, a first lens element at the first side of the optical lens assembly 500 is the most sensitive lens element in the optical lens assembly 500 to temperature effect. Hence, when the glass lens element 520 is the glass lens element with the low linear expansivity $\alpha_1$, the optical lens assembly 500 can be maintained to be stable after temperature changing, and the function (membrane thickness, adhesion, completeness of a membrane layer and a cut-off wavelength) of the anti-reflective membrane layer can be maintained. Meanwhile, the optical lens assembly 500 can be matched with plastic lens elements to improve design freedom, increase productivity, and decrease the production cost.

6th Embodiment

Figure 6:
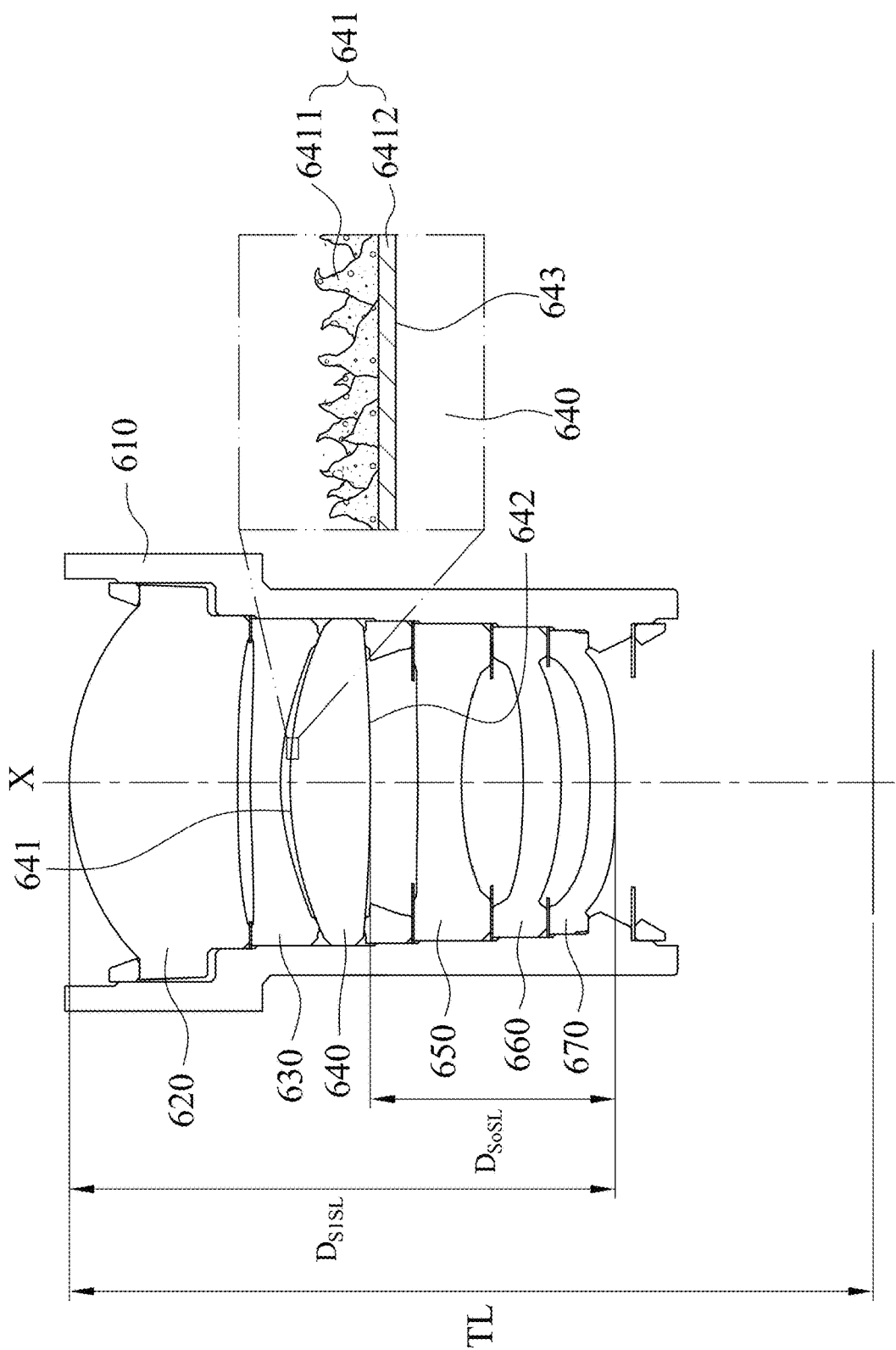
FIG. 6 shows a schematic view of an optical lens assembly of an optical module according to the 6th embodiment of the present disclosure.

FIG. 6 shows a schematic view of an optical lens assembly 600 of an optical module according to the 6th embodiment of the present disclosure. As shown in FIG. 6, an optical module (its reference numeral is omitted) includes a light source (not shown) and an optical lens assembly 600. An optical axis X passes through the optical lens assembly 600, and the optical lens assembly 600 includes a lens barrel 610 and at least three lens elements. The at least three lens elements, which are, in order from an object side to an image side, lens elements 620, 630, a glass lens element 640 and lens elements 650, 660, 670 are disposed in the lens barrel, wherein the glass lens element 640 is closer to the light source than the lens elements 650, 660, 670 to the light source. Each of the lens elements 620, 630, 650, 660, 670 and the glass lens element 640 has refractive power, and optical surfaces of the lens elements 620, 630, 650, 660, 670 and the glass lens element 640 are non-planar.

Moreover, anti-reflective membrane layers 641, 642 are formed on the optical surfaces of the glass lens element 640. Take the anti-reflective membrane layer 641 of the glass lens element 640 for example, the anti-reflective membrane layer 641 of the glass lens element 640 is formed on the optical surface 643 of the glass lens element 640, and the anti-reflective membrane layer 641 includes a nanostructure layer 6411 and a structure connection film 6412. The nanostructure layer 6411 has a plurality of ridge-like protrusions extending non-directionally from the optical surface 643, a material of the nanostructure layer 6411 includes aluminum oxide, and an average structure height of the nanostructure layer 6411 is greater than or equal to 80 nm and less than or equal to 350 nm. The structure connection film 6412 is disposed between the optical surface 643 and the nanostructure layer 6411, the structure connection film 6412 includes at least one silicon dioxide layer (not shown), and the silicon dioxide layer contacts a bottom of the nanostructure layer 6411 physically, and a thickness of the silicon dioxide layer is greater than or equal to 20 nm and less than or equal to 150 nm.

Specifically, other optical elements such as a light blocking sheet, a spacer, a retainer and etc. can be disposed in the lens barrel 610 on demand, but it will not be described herein.

In the 6th embodiment, when a distance from a first side surface (an object-side surface of the glass lens element 640) to a second side surface (an image-side surface of the lens element 670) of the optical lens assembly 600 along the optical axis X is $D_{S1SL}$, a distance from the optical surface of the glass lens element 640 (an image-side surface of the glass lens element 640) to the second side surface along the optical axis X is $D_{SoSL}$, and a distance from an object-side surface of a first side lens element (that is, the lens element 620) of the optical lens assembly 600 to an image surface along the optical axis X is TL, the conditions related to the parameters can be satisfied as the following Table 16.

TABLE 16 the 6th embodiment

| | |
|---|---|
| $D_{S1SL}$ (mm) | 13 |
| $D_{SoSL}$ (mm) | 5.83 |
| $D_{SoSL}/D_{S1SL}$ | 0.449 |
| TL (mm) | 19.15 |

Moreover, when the glass lens element 640 has the first average linear expansivity $\alpha_1$ in the temperature region between −30° C. to 70° C., a temperature coefficient of refractive index of the glass lens element 640 in the temperature region between −30° C. to 70° C. is dn/dt, and each of the structure connection film 6412 of the anti-reflective membrane layers 641 and a structure connection film of the anti-reflective membrane layers 642 has a second average linear expansivity $\alpha_2$ in the temperature region between −30° C. to 70° C., the aforementioned parameters are satisfied as the following Table 17.

TABLE 17 the glass lens element 640 of the 6th embodiment

| $\alpha_1$ ($10^{-7}$/K) | 92 | dn/dt ($10^{-6}$/K) | −2.1~−1.7 |
|---|---|---|---|
| anti-reflective membrane layer 641 | | anti-reflective membrane layer 642 | |
| $\alpha_2$ ($10^{-7}$/K) | 6.5 | $\alpha_2$ ($10^{-7}$/K) | 6.5 |
| $\alpha_1/\alpha_2$ | 14.2 | $\alpha_1/\alpha_2$ | 14.2 |

7th Embodiment

Figure 7A:
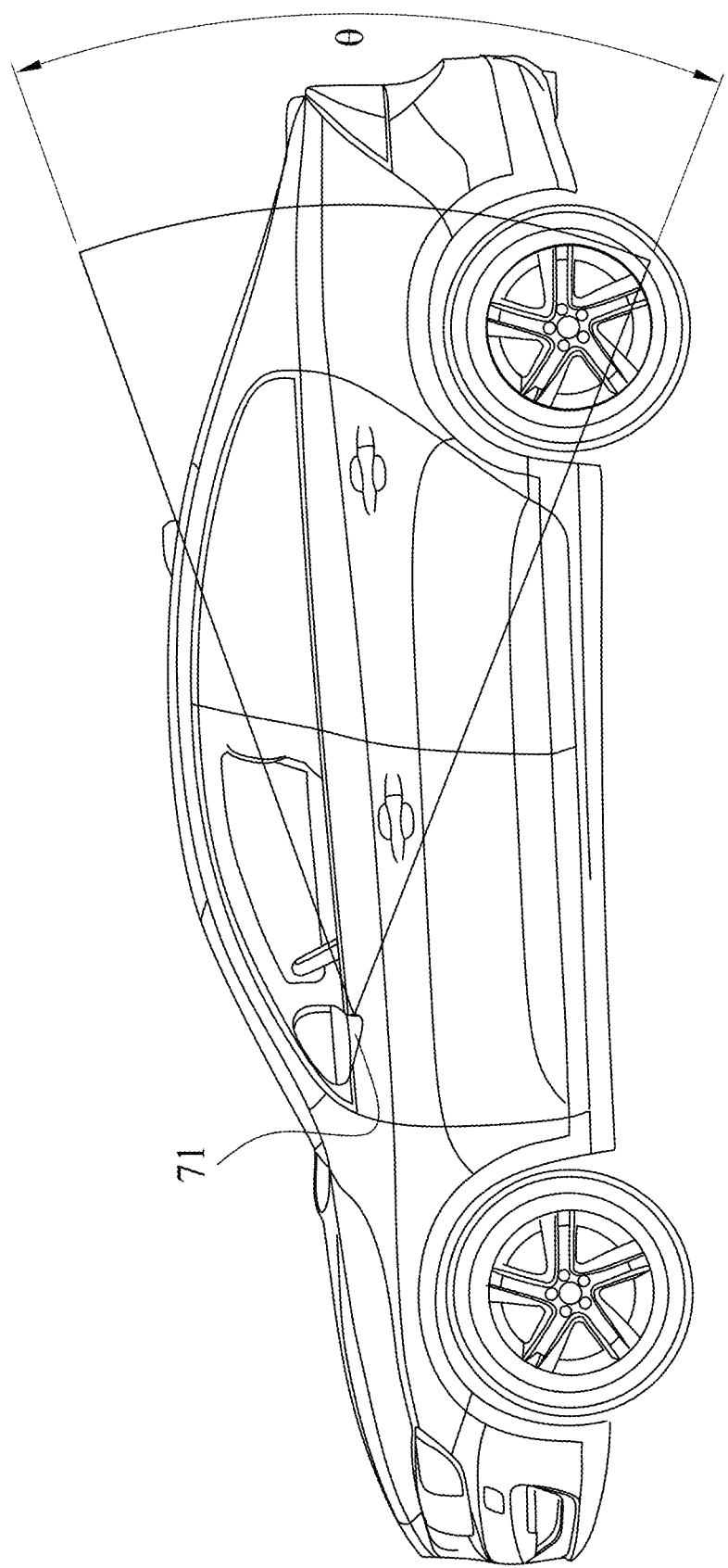
FIG. 7A shows a schematic view of a vehicle device according to the 7th embodiment of the present disclosure.
Figure 7B:
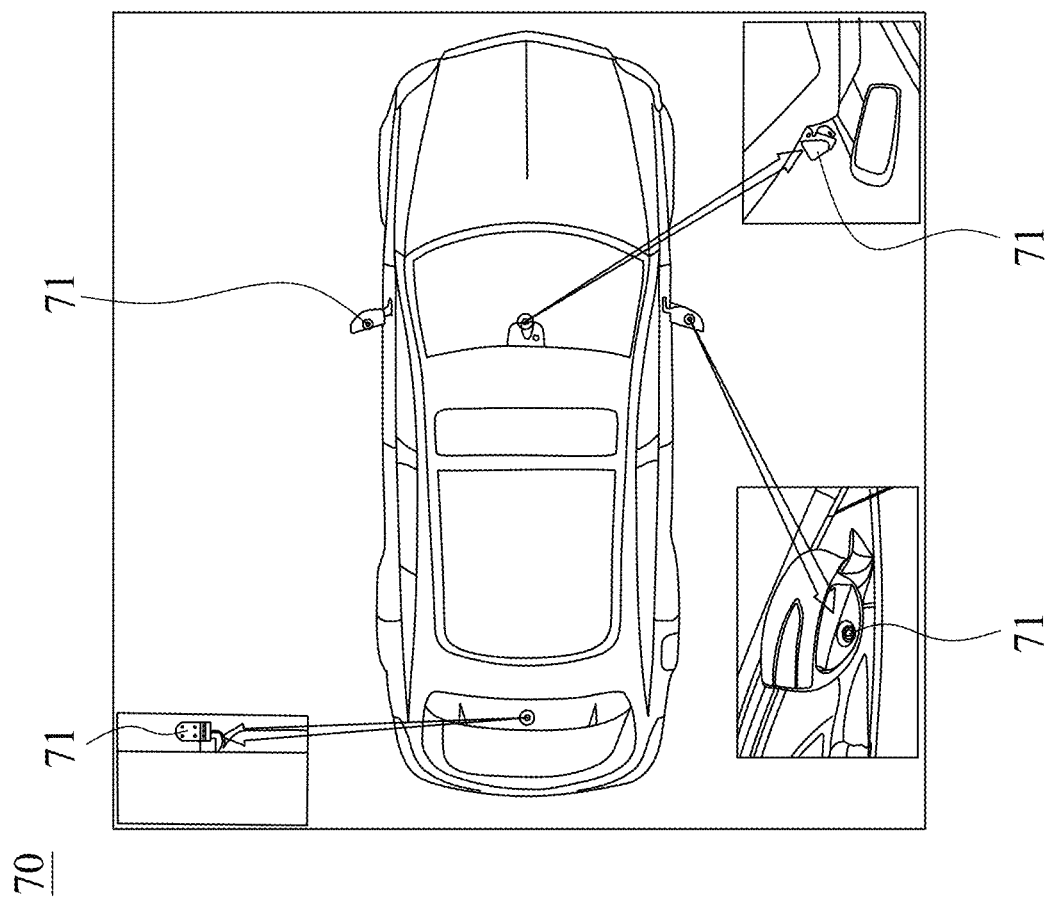
FIG. 7B shows a top view of the vehicle device according to the 7th embodiment in FIG. 7A.
Figure 7C:
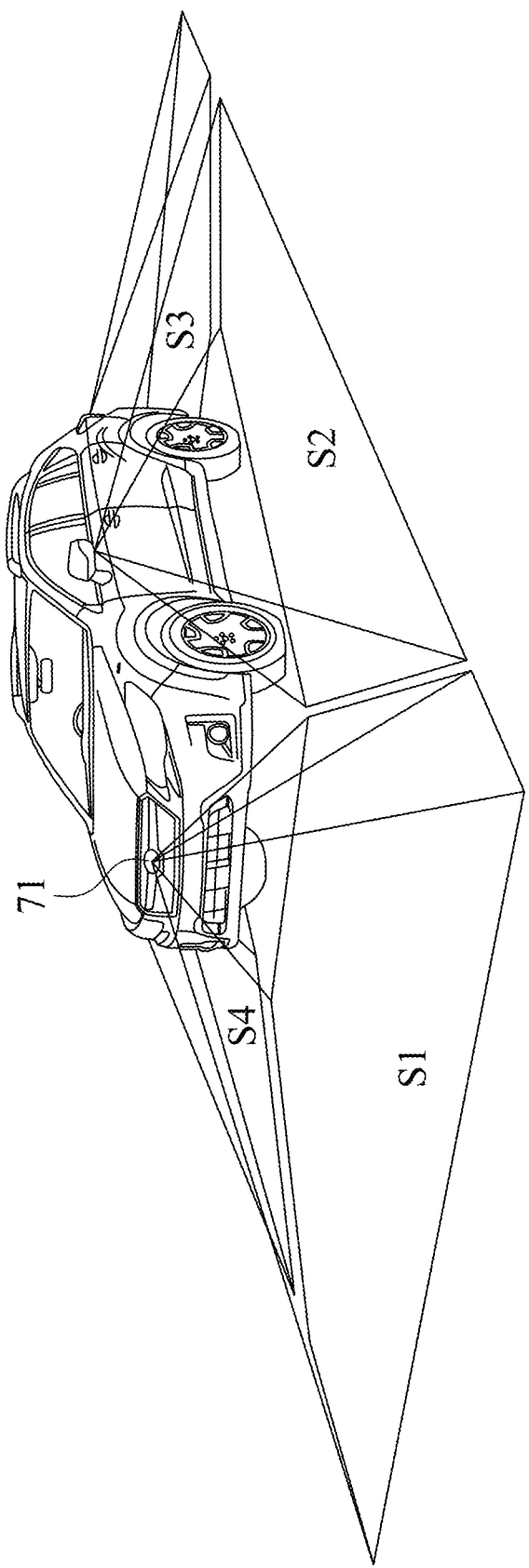
FIG. 7C shows another schematic view of the vehicle device according to the 7th embodiment in FIG. 7A.

FIG. 7A shows a schematic view of a vehicle device 70 according to the 7th embodiment of the present disclosure. FIG. 7B shows a top view of the vehicle device 70 according to the 7th embodiment in FIG. 7A. FIG. 7C shows another schematic view of the vehicle device 70 according to the 7th embodiment in FIG. 7A. As shown in FIGS. 7A to 7C, the vehicle device 70 includes a plurality of optical modules 71. A number of the optical modules 71 is six, but the present disclosure is not limited thereto. The six optical modules 71 are disposed under a left rear view mirror and a right rear view mirror, on a front of the vehicle 70, at a rear view mirror in the vehicle 70, at a rear window in the vehicle 70, and on a back of the vehicle 70, respectively. Each of the optical modules 71 can be any one of the 1st to 6th embodiments, but the present disclosure is not limited thereto.

In the 7th embodiment, each of the optical modules 71 is for capturing image information from a field of view θ. Specifically, the field of view θ can satisfy the following condition: 40 degrees<θ<190 degrees. Hence, the image information in a certain region can be captured. It is worthy to be mentioned that the field of view θ of each of the optical modules 71 can be different to satisfy different requirements of capturing image.

As shown in FIG. 7C, via the configuration of the optical modules 71, it is favorable for the user obtaining the external space information S1, S2, S3, S4 out of the driving seat. Specifically, the optical module 71 disposed on the front of the vehicle 70 is for obtaining the external space information S1, the optical modules 71 disposed under the left rear view mirror and the right rear view mirror are for obtaining the external space information S2, S4, respectively, the optical modules 71 disposed on the back of the vehicle 70 is for obtaining the external space information S3, but the present disclosure is not limited thereto. Hence, the field of view can be provided widely to decrease the blind spot, and it is favorable for improving driving safety.

Figure 7D:
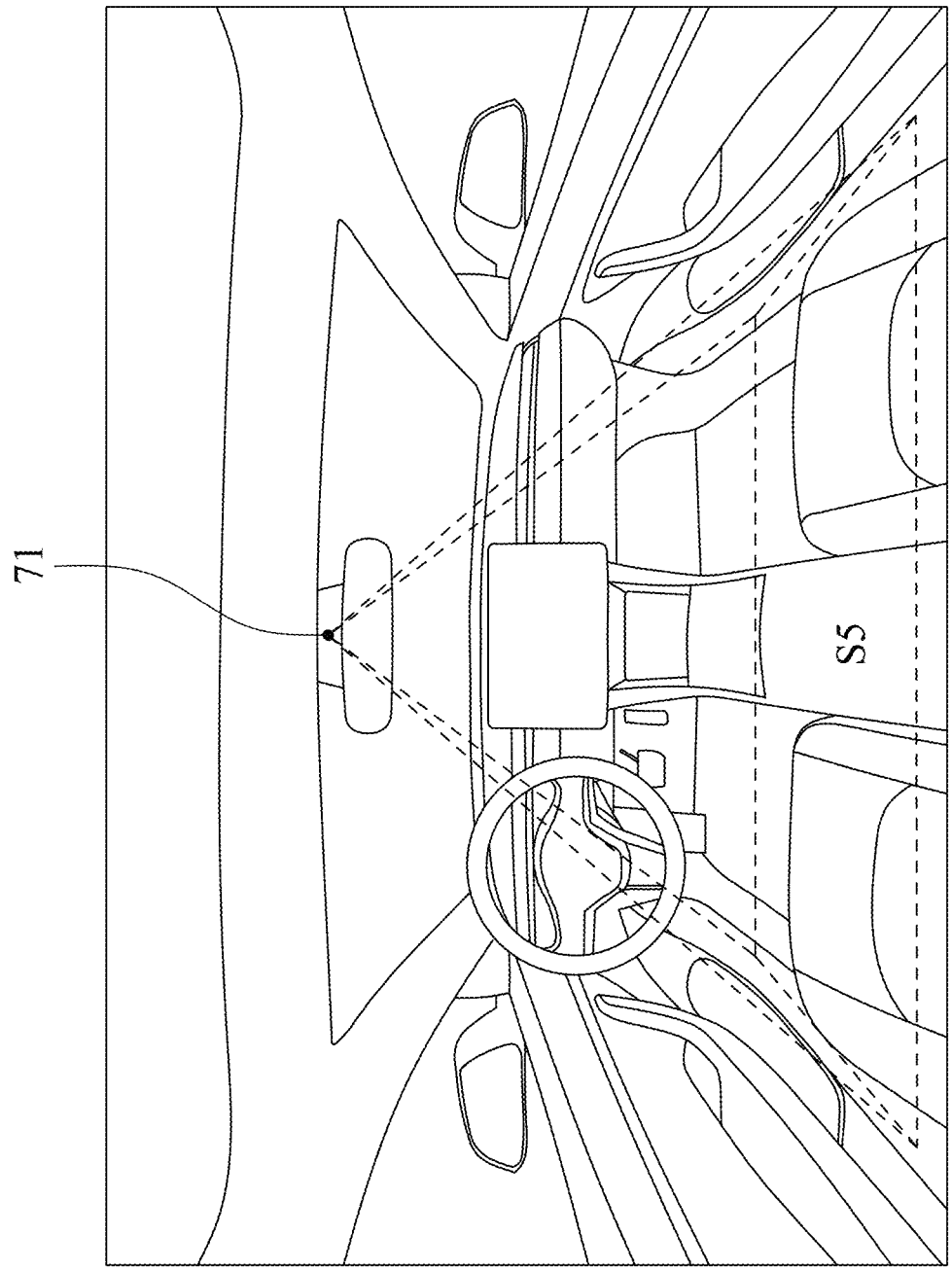
FIG. 7D shows a schematic view of an inner space of the vehicle according to the 7th embodiment in FIG. 7A.

FIG. 7D shows a schematic view of an inner space of the vehicle 70 according to the 7th embodiment in FIG. 7A. As shown in FIG. 7D, the optical module 71 disposed at the rear view mirror in the vehicle 70 is for obtaining internal space information S5. In general, when a conventional vehicle is parked and exposed under Sun, the heat in the vehicle will cause temperature drift effect on the optical module, and even damage the optical module to affect driving safety. Via the configuration of the glass lens element with low expansivity and the anti-reflective membrane layer, the optical modules 71 of the present disclosure can maintain stable in the environment of extremely temperature changing and maintain image quality.

8th Embodiment

Figure 8A:
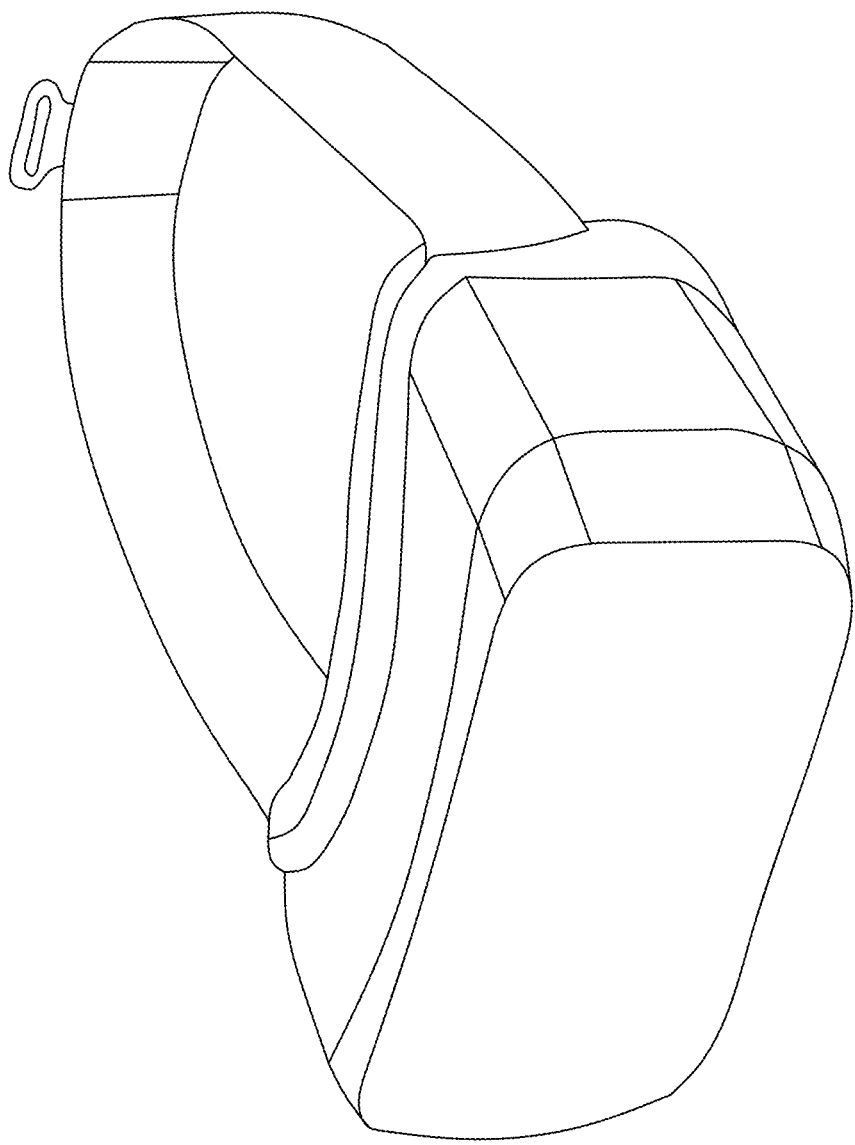
FIG. 8A shows a schematic view of a head-mounted device according to the 8th embodiment of the present disclosure.
Figure 8B:
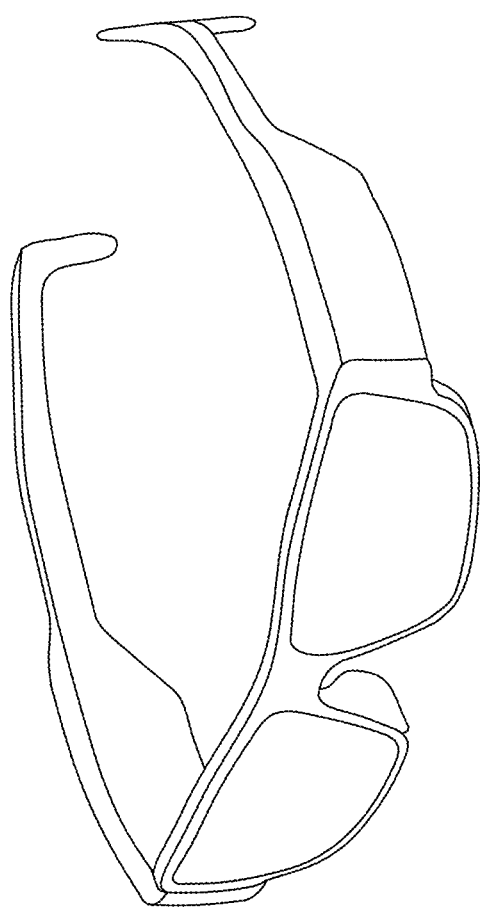
FIG. 8B shows a schematic view of another head-mounted device according to the 8th embodiment of the present disclosure.
Figure 8C:
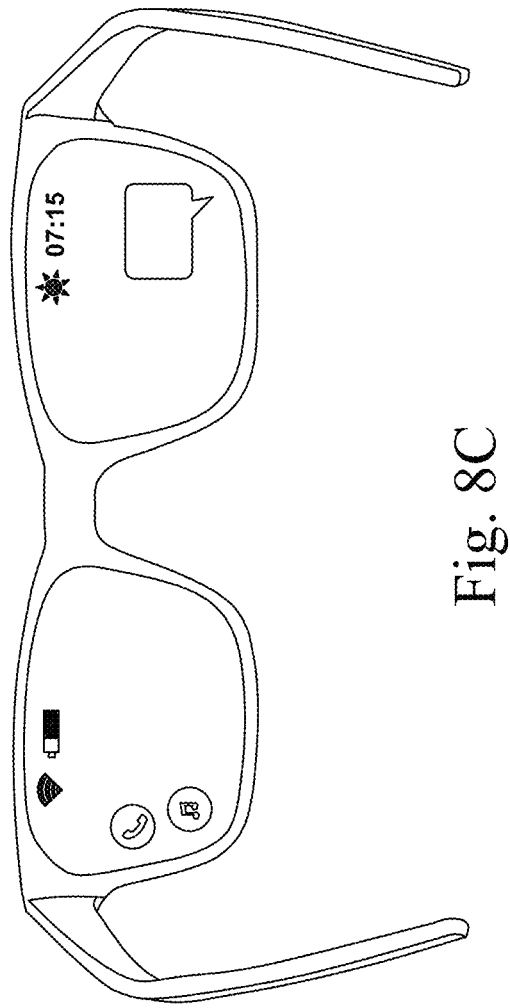
FIG. 8C shows another schematic view of the head-mounted device according to the 8th embodiment in FIG. 8B.

FIG. 8A shows a schematic view of a head-mounted device 80 according to the 8th embodiment of the present disclosure. FIG. 8B shows a schematic view of another head-mounted device 800 according to the 8th embodiment of the present disclosure. FIG. 8C shows another schematic view of the head-mounted device 800 according to the 8th embodiment in FIG. 8B. As shown in FIG. 8A, the head-mounted device 80 can be a VR device and includes a plurality of optical modules (not shown). The optical modules can be any one of the 1st to 6th embodiments, but the present disclosure is not limited thereto.

FIG. 8D shows a schematic view of an optical module according to the 8th embodiment in FIG. 8B. As shown in FIGS. 8B, 8C and 8D, the head-mounted device 800 can be an AR device and includes a plurality of optical modules (not shown), and each of the optical modules includes a light source 810 and a optical lens assembly 820. An optical axis X passes through the optical lens assembly 820. The optical lens assembly 820 includes a glass lens element 821, and the glass lens element 821 has refractive power. An optical surface of the glass lens element 821 is non-planar, and an anti-reflective membrane layer 8211 is formed on the optical surface. Specifically, the anti-reflective membrane layer 8211 includes a nanostructure layer and a structure connection film, each of the nanostructure layer and the structure connection film can be any one of the 1st embodiment to the 6th embodiment, and it will not be described herein. Moreover, the optical lens assembly 820 can further include any lens element of the 1st embodiment to the 6th embodiment and other optical elements, but the present disclosure is not limited thereto.

In the 8th embodiment, the glass lens element 821 can be an array lens element. The light source 810 can be a plurality of display elements arranged in array. Specifically, the arrangement of the light source 810 can be the same as the arrangement of the glass lens element 821, but the present disclosure is not limited thereto.

Figure 8E:
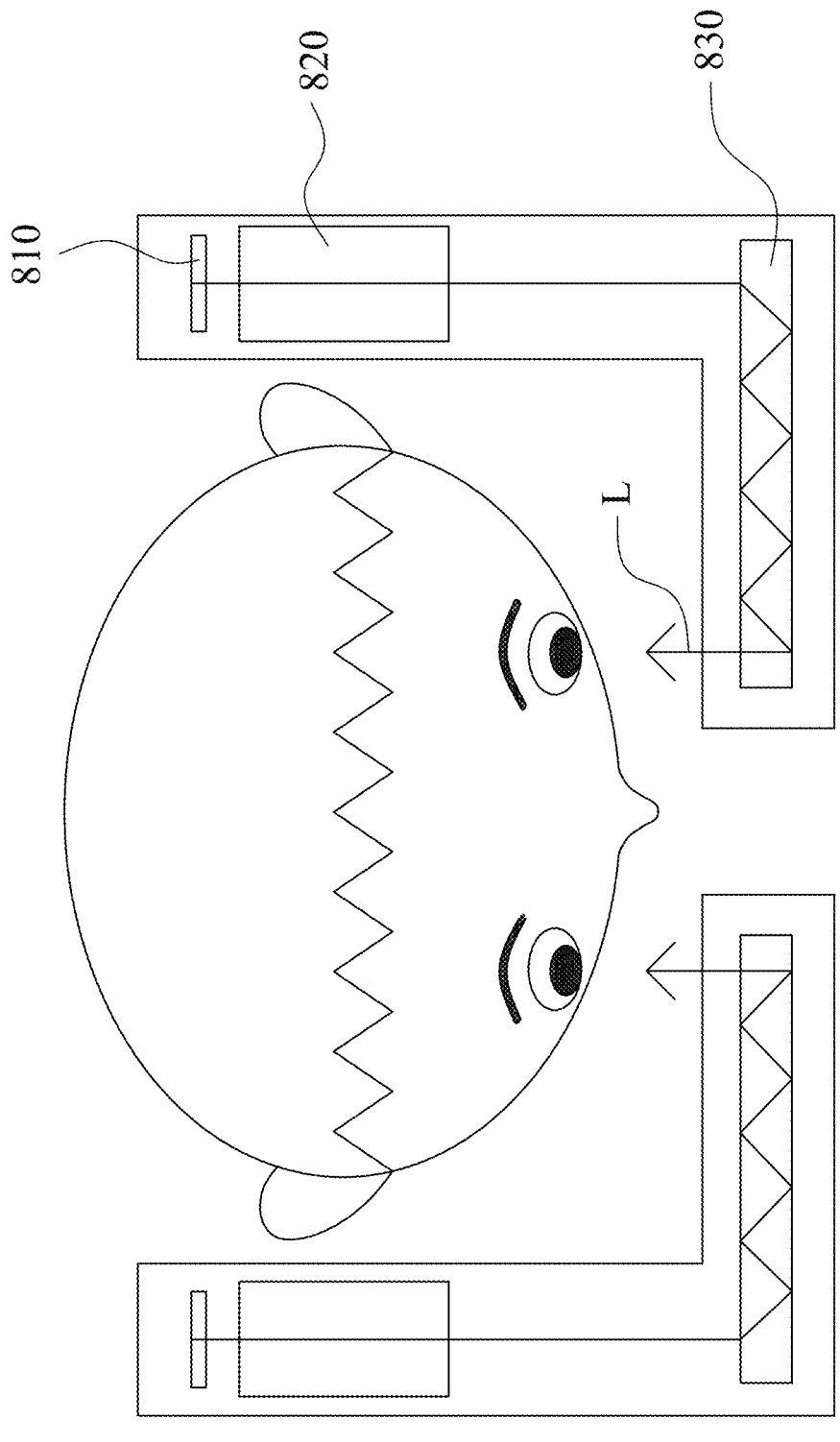
FIG. 8E shows a schematic view of using the head-mounted device according to the 8th embodiment in FIG. 8B.
Figure 8F:
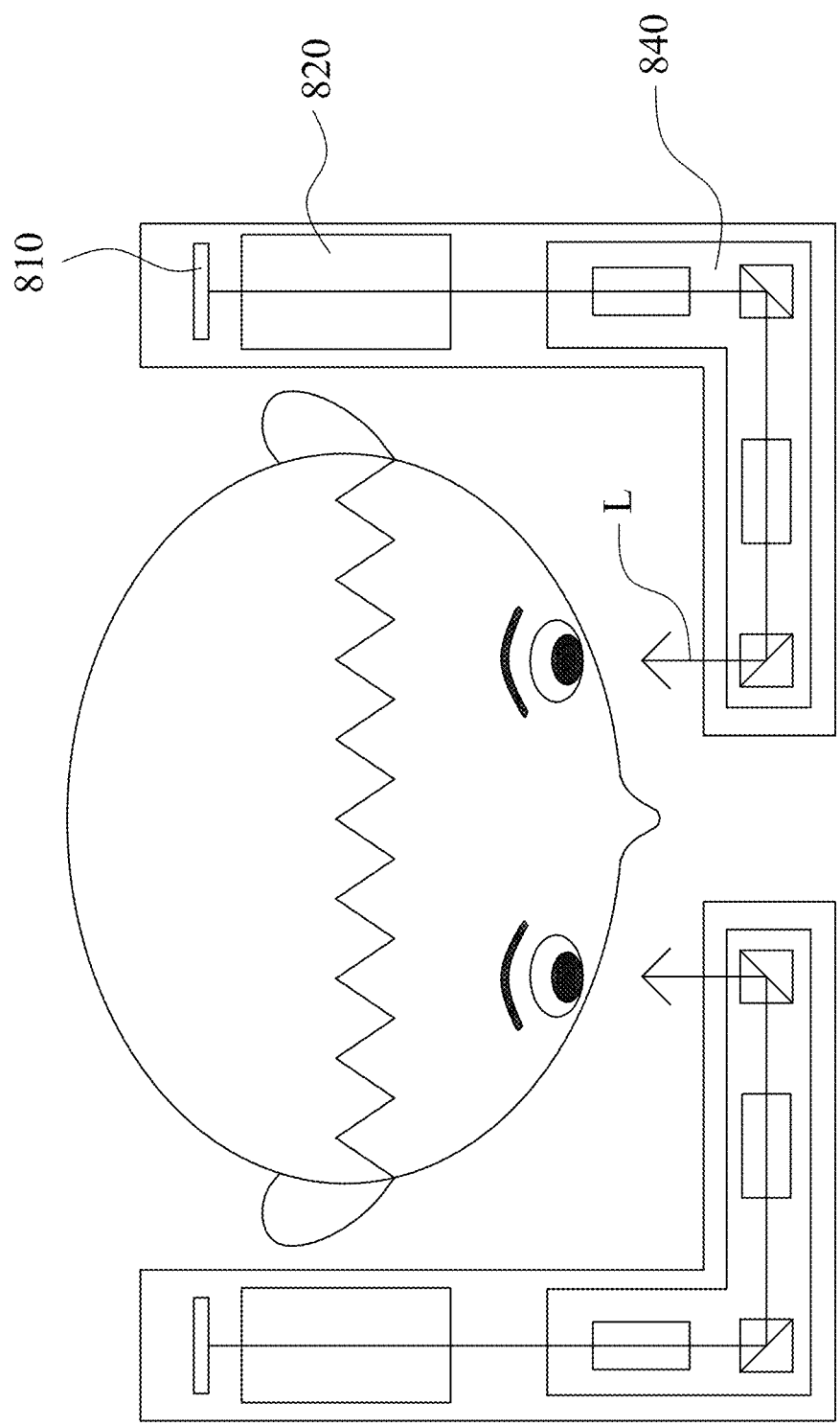
FIG. 8F shows another schematic view of using the head-mounted device according to the 8th embodiment in FIG. 8B.

FIG. 8E shows a schematic view of using the head-mounted device 800 according to the 8th embodiment in FIG. 8B. FIG. 8F shows another schematic view of using the head-mounted device 800 according to the 8th embodiment in FIG. 8B. As shown in FIG. 8E, the optical module can further include an image transmitting module 830 which is disposed on at least one side of an object side and an image side of the optical lens assembly 820. In the 8th embodiment, the image transmitting module 830 can be a waveguide module and disposed on the image side of the optical lens assembly 820. As shown in FIG. 8F, the image transmitting module 830 can be a light path folding element 840, and disposed on the image side of the optical lens assembly 820. Via the configuration of the image transmitting module, a light path of an imaging light L of the light source 810 can be folded and transmitted to the eye of the user.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens assembly, an optical axis passing through the optical lens assembly, comprising:
   a glass lens element having a refractive power, an optical surface of the glass lens element being non-planar, an anti-reflective membrane layer formed on the optical surface, and the anti-reflective membrane layer comprising:
      a nanostructure layer having a plurality of ridge-like protrusions extending non-directionally from the optical surface, and a material of the nanostructure layer comprising aluminum oxide; and
      a structure connection film disposed between the optical surface and the nanostructure layer, the structure connection film comprising at least one silicon dioxide layer, the at least one silicon dioxide layer physically contacting a bottom of the nanostructure layer, and a thickness of the at least one silicon dioxide layer being greater than or equal to 20 nm and less than or equal to 150 nm;
   wherein the glass lens element has a first average linear expansivity $\alpha_1$ in a temperature region between $-30°$ C. to $70°$ C., and the following condition is satisfied:
   $12 \times 10^{-7}/K < \alpha_1 < 210 \times 10^{-7}/K$;
   wherein the nanostructure layer is directly connected to the structure connection film, the material of the nanostructure layer is different from a material of the structure connection film;
   wherein a top of the structure connection film is partially covered by the nanostructure layer.

2. The optical lens assembly of claim 1, wherein each of the ridge-like protrusions is in a shape shrinking from a bottom to a top thereof, and an average structure height of the nanostructure layer is greater than or equal to 80 nm and less than or equal to 350 nm.

3. The optical lens assembly of claim 1, wherein a distance from a first side surface to a second side surface of the optical lens assembly along the optical axis is $D_{S1SL}$, a distance from the optical surface to the second side surface along the optical axis is $D_{SoSL}$, and the following condition is satisfied:
   $0.12 \leq D_{SoSL}/D_{S1SL} < 0.985$.

4. The optical lens assembly of claim 1, wherein a maximum value of a reflectivity of the optical surface of the glass lens element in a wavelength region between 400 nm and 780 nm is $R_{abs}$, and the following condition is satisfied:
   $0\% \leq R_{abs} \leq 1.0\%$.

5. The optical lens assembly of claim 4, wherein an average value of the reflectivity of the optical surface of the glass lens element in the wavelength region between 400 nm and 780 nm is $R_{avg}$, and the following condition is satisfied:
   $0\% \leq R_{avg} \leq 0.5\%$.

6. The optical lens assembly of claim 1, wherein the glass lens element has the first average linear expansivity $\alpha_1$ in the temperature region between $-30°$ C. to $70°$ C., the structure connection film has a second average linear expansivity $\alpha_2$ in the temperature region between $-30°$ C. to $70°$ C., and the following condition is satisfied:
   $0.2 < \alpha_1/\alpha_2 < 41$.

7. The optical lens assembly of claim 1, wherein a temperature coefficient of refractive index of the glass lens element in the temperature region between $-30°$ C. to $70°$ C. is dn/dt, and the following condition is satisfied:
   $0.1 \times 10^{-6}/°$ C. $\leq |dn/dt| \leq 17 \times 10^{-6}/°$ C.

8. The optical lens assembly of claim 1, wherein the optical surface has an inflection point.

9. The optical lens assembly of claim 1, wherein a distance from an object-side surface of a first side lens element of the optical lens assembly to an image surface along the optical axis is TL, and the following condition is satisfied:
   8 mm≤TL.

10. The optical lens assembly of claim 1, wherein the glass lens element is disposed at a first side of the optical lens assembly, and the optical lens assembly further comprises a plastic lens element disposed at an image side of the glass lens element along the optical axis.

11. The optical lens assembly of claim 1, further comprising a cemented lens element.

12. The optical lens assembly of claim 1, further comprising:
   at least one light path folding element disposed on at least one of an object side and an image side of the optical lens assembly.

13. An optical module, comprising:
   a light source; and
   an optical lens assembly, an optical axis passing through the optical lens assembly, comprising:
      at least three lens elements, at least one of the at least three lens elements being a glass lens element, wherein the glass lens element has a refractive power, the glass lens element is closer to the light source than the other at least two lens elements, an optical surface of the glass lens element is non-planar, an anti-reflective membrane layer is formed on the optical surface, and the anti-reflective membrane layer comprises:
         a nanostructure layer having a plurality of ridge-like protrusions extending non-directionally from the optical surface, and a material of the nanostructure layer comprising aluminum oxide; and
         a structure connection film disposed between the optical surface and the nanostructure layer, the structure connection film comprising at least one silicon dioxide layer, the at least one silicon dioxide layer physically contacting a bottom of the nanostructure layer, and a thickness of the at least one silicon dioxide layer being greater than or equal to 20 nm and less than or equal to 150 nm;
      wherein the glass lens element has a first average linear expansivity $\alpha_1$ in a temperature region between $-30°$ C. to $70°$ C., and the following condition is satisfied:
      $12 \times 10^{-7}/K < \alpha_1 < 210 \times 10^{-7}/K$;
      wherein the nanostructure layer is directly connected to the structure connection film, the material of the nanostructure layer is different from a material of the structure connection film;
      wherein a top of the structure connection film is partially covered by the nanostructure layer.

14. The optical module of claim 13, wherein each of the ridge-like protrusions is in a shape shrinking from a bottom to a top thereof, and an average structure height of the nanostructure layer is greater than or equal to 80 nm and less than or equal to 350 nm.

15. The optical module of claim 13, wherein a distance from a first side surface to a second side surface of the optical lens assembly along the optical axis is $D_{S1SL}$, a distance from the optical surface to the second side surface along the optical axis is $D_{SoSL}$, and the following condition is satisfied:

$0.12 \leq D_{SoSL}/D_{S1SL} < 0.985$.

16. The optical module of claim 13, wherein the glass lens element is an array lens element.

17. The optical module of claim 13, wherein a maximum value of reflectivity of the optical surface of the glass lens element in a wavelength region between 400 nm and 780 nm is $R_{abs}$, and the following condition is satisfied:

$0\% \leq R_{abs} \leq 1.0\%$.

18. The optical module of claim 17, wherein an average value of reflectivity of the optical surface of the glass lens element in the wavelength region between 400 nm and 780 nm is $R_{avg}$, and the following condition is satisfied:

$0\% \leq R_{avg} \leq 0.5\%$.

19. The optical module of claim 13, wherein the glass lens element has a first average linear expansivity $\alpha_1$ in the temperature region between $-30°$ C. to $70°$ C., the structure connection film has a second average linear expansivity $\alpha_2$ in the temperature region between $-30°$ C. to $70°$ C., and the following condition is satisfied:

$0.2 < \alpha_1/\alpha_2 < 41$.

20. The optical module of claim 13, wherein the optical lens assembly further comprises:
at least one light path folding element disposed on at least one side of an object side and an image side of the optical lens assembly.

21. An optical module, comprising:
a light source; and
an optical lens assembly, an optical axis passing through the optical lens assembly, comprising:
at least three lens elements, at least one of the at least three lens elements being a glass lens element, wherein the glass lens element has a refractive power, the glass lens element is closer to the light source than the other at least two lens elements, an optical surface of the glass lens element is non-planar, an anti-reflective membrane layer is formed on the optical surface, and the anti-reflective membrane layer comprises:
a nanostructure layer has a plurality of ridge-like protrusions extending non-directionally from the optical surface, and a material of the nanostructure layer comprising aluminum oxide; and
a structure connection film disposed between the optical surface and the nanostructure layer, the structure connection film comprising at least one silicon dioxide layer, the at least one silicon dioxide layer physically contacting a bottom of the nanostructure layer, and a thickness of the at least one silicon dioxide layer being greater than or equal to 20 nm and less than or equal to 150 nm;
wherein a maximum effective radius of the optical surface is Y, an intersection point between the optical surface and the optical axis to a position of the maximum effective radius of the optical surface has a maximum displacement $SAG_{glass}$, the glass lens element has a first average linear expansivity $\alpha_1$ in a temperature region between $-30°$ C. to $70°$ C., and the following conditions are satisfied:

$0.01 \leq SAG_{glass}/Y \leq 0.99$; and $12 \times 10^{-7}/K < \alpha_1 < 210 \times 10^{-7}/K$;

wherein the nanostructure layer is directly connected to the structure connection film, the material of the nanostructure layer is different from a material of the structure connection film;
wherein a top of the structure connection film is partially covered by the nanostructure layer.

22. The optical module of claim 21, wherein each of the ridge-like protrusions is in a shape shrinking from bottom to top, and an average structure height of the nanostructure layer is greater than or equal to 80 nm and less than or equal to 350 nm.

23. The optical module of claim 21, wherein the glass lens element is an array lens element.

24. The optical module of claim 21, wherein a maximum value of reflectivity of the optical surface of the glass lens element in a wavelength region between 400 nm and 780 nm is $R_{abs}$, and the following condition is satisfied:

$0\% \leq R_{abs} \leq 1.0\%$.

25. The optical module of claim 24, wherein an average value of reflectivity of the optical surface of the glass lens element in a wavelength region between 400 nm and 780 nm is $R_{avg}$, and the following condition is satisfied:

$0\% \leq R_{avg} \leq 0.5\%$.

26. The optical module of claim 21, wherein the glass lens element has a first average linear expansivity $\alpha_1$ in the temperature region between $-30°$ C. to $70°$ C., the structure connection film has a second average linear expansivity $\alpha_2$ in the temperature region between $-30°$ C. to $70°$ C., and the following condition is satisfied:

$0.2 < \alpha_1/\alpha_2 < 41$.

27. The optical module of claim 21, wherein the intersection point between the optical surface and the optical axis to a position of the maximum effective radius of the optical surface has a maximum displacement $SAG_{glass}$, and the following condition is satisfied:

$90 \mu m \leq SAG_{glass}$.

28. The optical module of claim 27, wherein the optical surface has an inflection point.

29. The optical module of claim 21, wherein the optical lens assembly further comprises:
at least one light path folding element disposed on at least one side of an object side and an image side of the optical lens assembly.

30. The optical module of claim 21, wherein the light source is a plurality of display elements arranged in array.

* * * * *